United States Patent
Miller et al.

(10) Patent No.: US 8,736,434 B2
(45) Date of Patent: *May 27, 2014

(54) SYSTEM AND METHOD FOR RECORDING VEHICLE EVENTS AND FOR GENERATING REPORTS CORRESPONDING TO THE RECORDED VEHICLE EVENTS BASED ON DRIVER STATUS

(71) Applicant: Ford Global Technologies, LLC, Dearborn, MI (US)

(72) Inventors: Thomas Lee Miller, Ann Arbor, MI (US); Scott Alan Watkins, Canton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,295

(22) Filed: Jun. 11, 2013

(65) Prior Publication Data

US 2013/0274957 A1 Oct. 17, 2013

Related U.S. Application Data

(63) Continuation of application No. 12/992,434, filed as application No. PCT/US2009/048612 on Jun. 25, 2009, now Pat. No. 8,466,781.

(60) Provisional application No. 61/076,329, filed on Jun. 27, 2008.

(51) Int. Cl.
*B60Q 1/00* (2006.01)

(52) U.S. Cl.
USPC .......................... 340/439; 340/526; 340/457.1

(58) Field of Classification Search
USPC ............ 340/439, 576, 436, 457.1, 992, 573.1
See application file for complete search history.

(56) References Cited

U.S. PATENT DOCUMENTS

| 5,394,136 A | 2/1995 | Lammers et al. |
|---|---|---|
| 5,758,299 A | 5/1998 | Sandborg et al. |

(Continued)

FOREIGN PATENT DOCUMENTS

| DE | 19961619 A1 | 6/2001 |
|---|---|---|
| EP | 1811481 A1 | 7/2007 |

(Continued)

OTHER PUBLICATIONS www.zr1netregistry.com/ZR1_about.htm, "ZR-1 Introduction", Sep. 25, 2006, 4 pages.

(Continued)

*Primary Examiner* — Toan N Pham
(74) *Attorney, Agent, or Firm* — Brooks Kushman P.C.; Jennifer M. Stec

(57) ABSTRACT

In at least one embodiment, an apparatus for recording events in a vehicle based on driver status of a driver is provided. The apparatus comprises a vehicle interface device. The device is configured to receive a driver status signal indicative of the driver being one of a primary driver and a secondary driver. The device is further configured to receive at least one vehicle event signal corresponding to vehicle events in response to the driver status signal indicating that the driver is the secondary driver and to store the at least one vehicle event signal to record the vehicle events. The device is further configured to generate a report indicating the recorded vehicle events for transmission to at least one of the primary driver and the secondary driver.

18 Claims, 9 Drawing Sheets

(56) References Cited

U.S. PATENT DOCUMENTS

| | | |
|---|---|---|
| 5,769,051 A | 6/1998 | Bayron et al. |
| 5,803,043 A | 9/1998 | Bayron et al. |
| 5,829,782 A | 11/1998 | Breed et al. |
| 6,157,317 A | 12/2000 | Walker |
| 6,225,890 B1 | 5/2001 | Murphy |
| 6,389,340 B1 | 5/2002 | Rayner |
| 6,430,488 B1 | 8/2002 | Goldman et al. |
| 6,542,076 B1 | 4/2003 | Joao |
| 6,701,234 B1 | 3/2004 | Vogelsang |
| 6,772,061 B1 | 8/2004 | Berthiaume et al. |
| 6,909,947 B2 | 6/2005 | Douros et al. |
| 6,952,156 B2 | 10/2005 | Arshad et al. |
| 6,998,956 B2 | 2/2006 | Dix |
| 7,023,333 B2 | 4/2006 | Blanco et al. |
| 7,075,409 B2 | 7/2006 | Guba |
| 7,117,075 B1 | 10/2006 | Larschan et al. |
| 7,271,712 B2 | 9/2007 | Rubel |
| 7,356,392 B2 | 4/2008 | Hubbard et al. |
| 7,757,803 B2 | 7/2010 | Fiske et al. |
| 7,812,712 B2 | 10/2010 | White et al. |
| 7,959,177 B2 | 6/2011 | Fiske et al. |
| 8,466,781 B2 * | 6/2013 | Miller et al. ............. 340/439 |
| 2002/0111725 A1 | 8/2002 | Burge |
| 2003/0154009 A1 | 8/2003 | Basir et al. |
| 2004/0263316 A1 | 12/2004 | Dix et al. |
| 2005/0125110 A1 | 6/2005 | Potter et al. |
| 2006/0142913 A1 * | 6/2006 | Coffee et al. ............. 701/35 |
| 2007/0126604 A1 | 6/2007 | Thacher |
| 2007/0219685 A1 | 9/2007 | Plante |
| 2009/0195376 A1 | 8/2009 | Miller et al. |
| 2009/0312901 A1 | 12/2009 | Miller et al. |

FOREIGN PATENT DOCUMENTS

| | | |
|---|---|---|
| GB | 2273580 A | 6/1994 |
| WO | 2005109273 A1 | 11/2005 |
| WO | 2007104982 A1 | 9/2007 |
| WO | 2007133994 A2 | 11/2007 |

OTHER PUBLICATIONS www.techedu.com/RoadSafety_RS-1000.asp, "Road Safety RS-1000 Automotive On-Board Computer for Teen Drivers", Sep. 27, 2006, 5 pages.

International Search Report and Written Opinion for corresponding Application No. PCT/US2009/048612, mailed Nov. 2, 2009, 14 pages.

Patty Mattern, "Getting smarter at getting safer", University of Minnesota, UMNews, Sep. 13, 2005, 2 pages.

European Search Report for Application No. EP 09770872.1, mailed Jun. 7, 2011, 6 pages.

European Examination Report for corresponding Application No. EP 09 771 001.6, mailed Apr. 3, 2012, 6 pages.

European Examination Report for corresponding Application No. EP 09 771 001.6, mailed Aug. 30, 2012, 5 pages.

European Examination Report for corresponding European Application No. 09 771 001.6, mailed Jul. 9, 2013, 5 pages.

* cited by examiner

| Data Set | Belt Usage Driver | Belt Usage Passenger | Max Speed | OCD Usage |
|---|---|---|---|---|
| 1 | 80% | 81% | 90 | 90% |
| 2 | 85% | 79% | 80 | 85% |
| 3 | 90% | 71% | 75 | 80% |
| 4 | 91% | 85% | 70 | 75% |
| 5 | 92% | 86% | 68 | 70% |

# US 8,736,434 B2
1

SYSTEM AND METHOD FOR RECORDING VEHICLE EVENTS AND FOR GENERATING REPORTS CORRESPONDING TO THE RECORDED VEHICLE EVENTS BASED ON DRIVER STATUS

CROSS-REFERENCE TO RELATED APPLICATIONS

This application is a continuation of U.S. application Ser. No. 12/992,434, filed Nov. 12, 2010, now U.S. Pat. No. 8,466,781, which, in turn, claims the benefit of PCT Application No. PCT/US2009/048612 filed on Jun. 25, 2009, which claims the benefit of U.S. provisional Application No. 61/076,329 filed on Jun. 27, 2008, the disclosures of which are incorporated in their entirety by reference herein.

TECHNICAL FIELD

The embodiments of the present invention generally relate to a system and method for recording vehicle events and for generating reports corresponding to the recorded vehicle events based on driver status.

BACKGROUND

With conventional automotive vehicles, one or more keys are often shared between any number of drivers (e.g., parent/teen, employer/employee, owner/valet driver, or fleet vehicle owner/fleet vehicle driver). In one example, the parents of a teenager (or young adult) that is old enough to drive may provide the keys of the vehicle with the teenager. The vehicle may be equipped with various safety and/or driver notification features that may be enabled/disabled via a user interface based on the driver's needs. However, in some circumstances, the parent may not intend to have the various safety and notification related features disabled by the teenager. The parent may enable the safety and notification features prior to allowing the teenager to drive the vehicle, however there is no guarantee that the teenager may keep the safety and notification features enabled while driving the vehicle. Conventional vehicles fail to give parents, or other such primary drivers, the option of preventing teenagers that are eligible to drive or other such secondary drivers from disabling safety and notification features.

In most cases, the parent, employer, owner of vehicle, or fleet owner may not be fully aware of the manner in which the vehicle is being driven by the teen, employee, valet service provider, or fleet vehicle driver. Furthermore, new drivers, such as teens, may not be aware of what constitutes dangerous driving behaviors and may not have a mechanism for monitoring their own driving performance. In most cases, the teen depends on the parent to instruct and counsel the teen to improve driving habits. However, parents (or other administrators) cannot be in the car with the teen (or other secondary persons) all of the time.

SUMMARY

In at least one embodiment, an apparatus for recording events in a vehicle based on driver status of a driver is provided. The apparatus comprises a vehicle interface device. The device is configured to receive a driver status signal indicative of the driver being one of a primary driver and a secondary driver. The device is further configured to receive at least one vehicle event signal corresponding to vehicle events in response to the driver status signal indicating that the driver is the secondary driver and to store the at least one vehicle event signal to record the vehicle events. The device is further configured to generate a report indicating the recorded vehicle events for transmission to at least one of the primary driver and the secondary driver.

DETAILED DESCRIPTION

Figure 1:
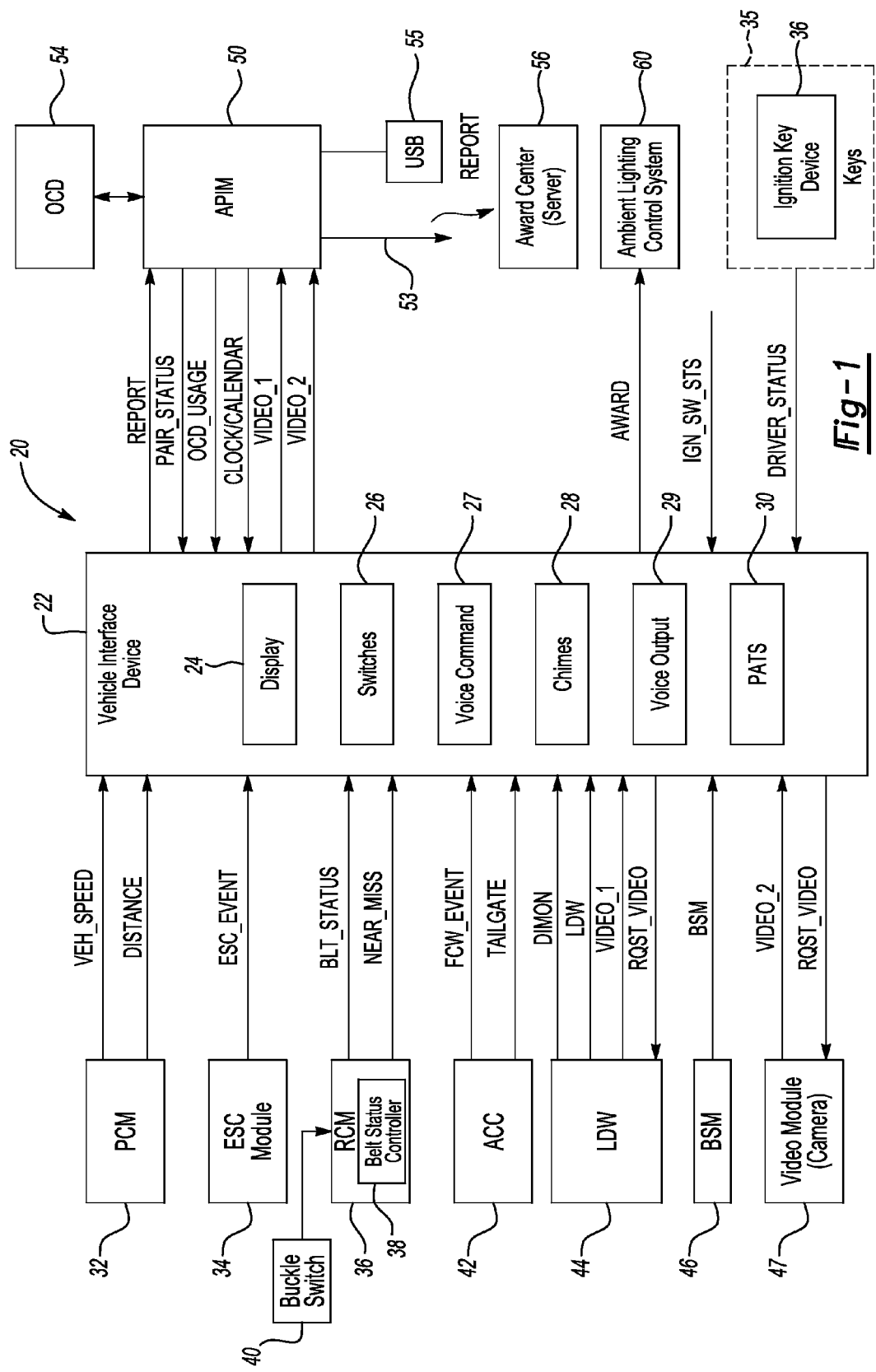
FIG. 1 depicts a system for differentiating between primary and secondary drivers of a vehicle and for recording vehicle events based on the status of the driver in accordance to one embodiment of the present invention.

The embodiments of the present invention generally provide for a driver identification functional operation whereby primary and secondary drivers are determined and various levels of control are granted to the driver based on whether the driver is the primary driver or the secondary driver. In general, the primary driver (e.g., a parent, employer, consumer of valet services, fleet vehicle owner) may be defined as the administrative driver who has greater control over the functionality of the various safety and/or notification features in the vehicle. For example, the primary driver may enable or disable the safety and/or notification features in the vehicle. The secondary driver may be defined as a restricted driver who has limited control over the safety and/or notification features generally provided by the vehicle and is to abide by the functional restrictions imposed or selected by the vehicle or the primary driver. For example, the primary driver may enable the safety and/or notification features for the secondary driver, and the secondary driver is not capable of disabling such features when enabled by the primary driver.

The embodiments of the present invention generally provide, among other things, for a system and method for recording vehicle events and for generating reports corresponding to the recorded vehicle events based on driver status. For example, a controller in the vehicle may determine driver status (e.g., whether the driver is the primary driver or the secondary driver) and record vehicle events if the driver is the secondary driver. The vehicle may provide performance ratings, usage profiles and/or other data with respect to the recorded events to educate the secondary driver to engage in safer driving practices. The recorded vehicle events may include, but not limited to, potential collision events, excessive speed events, belt buckle usage, OCD (e.g., phone) status/usage, and/or videos of exterior or interior portions of the vehicle.

The recorded events may be assembled and placed into a generated event report. The event report may be visually displayed to the driver within the vehicle or may be wirelessly transmitted to the primary/secondary driver and accessible via a computer to review the results. The generated report may also be downloaded from the vehicle into a portable memory device. The generated report may also be transmitted to an award center so that awards/prizes can be awarded to the secondary driver in the event such reports indicate good driving habits. The awards may be used as a mechanism to encourage the secondary driver to engage in safer driving habits.

The embodiments of the present invention as set forth in FIGS. 1-8 generally illustrate and describe a plurality of controllers (or modules/devices), or other electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired in the vehicle. It is generally recognized that each controller and/or module/device disclosed herein may include, but not limited to, any number of microprocessors, ASICs, ICs, memory devices (e.g., FLASH, RAM, ROM, EPROM, EEPROM, or other suitable variants thereof), firmware, and software which co-act with one another to perform the various functions set forth below.

FIG. 1 depicts a system 20 for differentiating between primary and secondary drivers of a vehicle and for recording vehicle events based on the status of the driver in accordance to one embodiment of the present invention. The system 20 generally comprises a vehicle interface device 22. The device 22 includes a display 24. The display 24 provides information related to the various states of vehicle functionality to the driver. For example, the display 24 may provide, but not limited to, a driver identification message during vehicle startup, various administrative menu options, a seatbelt warning message, a speed limit start up message, vehicle near top speed message, top speed message, driver identification speed warnings, and/or an inhibit ESC and FCW message. The display 24 may also provide performance data and/or usage profiles with respect to recorded vehicle events which will be described in more detail in connection with FIG. 6.

The device 22 also includes a plurality of switches 26, a voice recognition command interface 27, chimes 28, and a voice output capability 29. The driver may toggle the switches 26 to view different messages and/or respond to various prompts directed to the driver by the vehicle. The voice recognition command interface 27 may enable the vehicle to receive commands from the driver so that the driver may audibly input commands and/or responses. The voice recognition command interface 27 may enable the vehicle to receive commands from the driver so that the driver may audibly input commands and/or responses. One example of a voice recognition command interface is disclosed in U.S. Patent Publication No. 20040143440, entitled "Vehicle Speech Recognition System", filed Dec. 31, 2003. The chimes 28 may audibly notify the driver when predetermined vehicle conditions have been met. In one example, the device 22 may activate the chimes 28 when the vehicle is near a top speed, the vehicle has achieved a top speed, the vehicle has exceeded the top speed, there is a low level of fuel in the fuel tank, and/or when the traction control is enabled. The voice output capability 29 enables the device 22 to transmit audio signals to the driver. While the display 24, the switches 26, the voice input command interface 27, chimes 28, and the voice output capability 29 are shown within the device 22, it is contemplated that one or more of these mechanisms may be positioned exterior to the device 22.

The device 22 includes a passive anti-theft security (PATS) controller 30. While FIG. 1 generally illustrates that the PATS controller 30 is positioned within the device 22, other implementations may include the PATS controller 30 being implemented as a standalone controller (e.g., the PATS controller 30 is positioned external to the device 22). In general, one or more of the signals transmitted to/from the device 22 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 35. The device 22 may receive a signal IGN_SW_STS to determine the position of the ignition switch from a body controller (not shown). The keys 35 may be tagged or associated with the primary driver or the secondary driver of the vehicle. The key 35 includes an ignition key device 36 embedded therein for communicating with the vehicle. The ignition key device 36 may be in the form of a transponder (not shown) that includes an integrated circuit and an antenna. The transponder is adapted to transmit an electronic code as a signal DRIVER_STATUS to a receiver (not shown) in the PATS controller 30. The signal DRIVER_STATUS may be indicative of which driver (e.g., primary or secondary) is driving the vehicle. The signal DRIVER_STATUS may be in the form of radio frequency (RF) based signal or a radio frequency identification (RFID) tag that corresponds to binary data. The PATS controller 30 determines if the RF based data in the signal DRIVER_STATUS matches predetermined data stored therein (e.g., in a look up table of the PATS controller 30) prior to allowing the vehicle to start for anti-theft purposes. In the event the RF based data matches the predetermined data, a powertrain control module (or engine controller) 32 operably coupled to the PATS controller 30 enables the engine to start. In general, the vehicle assembly plant, supplier facility (e.g., manufacturer of the keys and/or PATS controller 30), car dealership, or vehicle owner performs the operation of learning the data transmitted by the keys 35. The PATS controller 30 may also use the data on the signal DRIVER_STATUS for purposes of identifying whether the driver of the vehicle is the primary driver or the secondary driver.

The PATS controller 30 may transmit a signal DRIVER_STATUS_1 to indicate whether the driver is the primary driver or the secondary driver. Prior to the PATS controller 30 transmitting the signal DRIVER_STATUS_1, the keys 35 need to be programmed as a primary key or as a secondary key. The manner in which the keys 35 are designated as either a primary key or a secondary key is set forth in one or more of the following U.S. patent Ser. No. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; Ser. No. 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; and Ser. No. 12/992,397 entitled "SYSTEM AND METHOD FOR CONTROLLING AN ENTERTAINMENT DEVICE IN A VEHICLE BASED ON DRIVER STATUS AND A PREDETERMINED VEHICLE EVENT" and filed on Nov. 12, 2010, all of which are hereby incorporated by reference in their entirety.

The PCM 32 transmits a signal VEH_SPEED that corresponds to a speed of the vehicle to the device 22. The PCM 32 transmits a signal DISTANCE that corresponds to the mileage of the vehicle to the device 22. In one example, the device 22 uses the mileage indicated on the signal DISTANCE as a means to determine start points and end points with respect to recording various vehicle events and transmitting completed reports detailing the recorded vehicle events.

For example, in the event the device 22 determines that the driver of the vehicle is the secondary driver, the device 22 may initiate the process of recording events and reporting such recorded events after a predetermined distance interval. For example, the device 22 may record vehicle events within every 500 mile interval and then report the recorded vehicle events that may have occurred for the secondary driver upon detecting that the vehicle has reached the end of the 500 mile interval by the secondary driver. A predetermined distance value is generally defined as a multiple of an end point of the predetermined distance interval. For example, the end point of the predetermined distance interval may be 500 miles. As such, the predetermined distance value may correspond to any one of 500, 1000, 1500 miles, etc. It is contemplated that the predetermined distance interval may comprise other values than that of between 0 and 500 miles. The particular values used to establish the predetermined distance interval may vary based on the desired criteria of a particular implementation. The primary driver can define the predetermined distance interval via one or more of the user interfaces within the device 22. It is also contemplated that the device 22 may use time either as hours/minutes and/or days as a mechanism for recording events. Upon the expiration of a particular time, the device 22 may transmit the generated report which includes the recorded events. In yet another example, the device 22 may use and combination of distance and time (e.g., which is detected to first occur) as a trigger to generate the report. The device 22 may display or transmit the recorded events (e.g., either audibly or visually) via the display 24 to either the primary or the secondary driver so that the driving behavior for the secondary driver can be assessed.

The device 22 receives the signal VEH_SPEED so that a maximum speed value that was attained by the secondary driver can be recorded. In yet another example, the vehicle may be programmed via the device 22 by the primary driver to have a maximum-speed limit (e.g., 80 mph or other suitable speed) for the secondary driver. The device 22 may record the number of times the maximum speed limit was attained and transmit the number of times therefrom as a mechanism to assess various driving habits for the secondary driver. The device 22 may report out on the number of times the secondary driver was detected to have driven the vehicle over the maximum speed value. The device 22 may assign ratings or other metrics for driver performance based on these detected events. Any occurrence of an over speed condition by the secondary driver while the driver is on the phone may be assigned an automatic poor rating.

An ESC module 34 is operably coupled to the device 22. The ESC module 34 is adapted to control the operation of various electronic stability control (ESC) systems, such as traction control (TC), yaw stability control (YSC) and rollover stability control (RSC). The ESC module 34 may include a TC controller (not shown), a YSC controller (not shown) and a RSC controller (not shown). In general, the ESC module 34 is further configured to detect the number of instances in which the ESC has been initiated by the secondary driver. For example, the ESC module 34 transmits a signal ESC_EVENT that corresponds to a single event in which the ESC module has had to, among other things, adjust the yaw angle of the vehicle, correct the speed of the vehicle and/or apply the brakes of the vehicle to correct the movement of the vehicle. Generally, these factors indicate potential collision events that may have occurred while the vehicle is being driven. The device 22 receives the signal ESC_EVENT and correlates the detected events noted thereon with other factors such as but not limited to, date/time, speed, number of passengers, buckle status for driver and passenger(s) located throughout the vehicle and/or phone status at the time the potential collision event occurred. The device 22 monitors such events and reports them out upon the vehicle achieving the predetermined distance interval.

For example, in the event the vehicle has achieved 500 miles, the device 22 may transmit (e.g., audibly or visually) the number of ESC events and/or the other factors noted above for viewing by the primary driver. Such information gives the primary driver the opportunity to discuss the occurrence of events and to counsel the secondary driver to become a better driver. The device 22 may assign usage ratings or other metrics for driver performance based on these detected events. In the event the incidents are detected to have occurred at high speeds, a poor rating may be assigned. In the event the incidents are detected to have occurred at lower speeds, a higher rating may be assigned. The device 22 automatically assigns an automatic low rating in the event a potential collision event occurs while the secondary driver is detected to be on the phone or other communication devices.

A restraint control module (RCM) 36 is operably coupled to the device 22. The RCM 36 may deploy various safety restraint systems in response to the vehicle experiencing an impact with an object. For example, the RCM 36 may deploy one or more airbags positioned about the vehicle, motorized pretensioners, and/or seat controls to reduce the risk of injury to vehicle occupants in the event the vehicle experiences an impact. The RCM 36 may be operably coupled to sensors in the vehicle that enable the RCM 36 to measure roll, yaw, and pitch rates associated with the vehicle. The RCM 36 may use the roll, yaw, and pitch to detect various "near miss" events such near miss events may also be defined as potential collision events. Near miss events generally include a sudden loss in speed and acceleration data (such as the roll, yaw, and pitch) or other high energy events. Such near miss events may not include the occurrence of an actual collision (e.g., actual deployment of airbag). The RCM 36 is configured to detect near miss events and transmit data indicating the presence of such over a signal NEAR_MISS to the device 22. The device 22 receives the signal NEAR_MISS and correlates the detected events noted thereon with other factors such as but not limited to, date/time, speed, number of passengers, buckle status for driver and passenger located throughout the vehicle and/or phone status at the time the potential collision event occurred. The device 22 monitors such events and reports them out upon the vehicle achieving the predetermined distance interval. In general, the RCM 36 is configured to provide similar information to that of the ESC module 34 and is provided in the event the vehicle is not equipped with the advanced active safety systems of the ESC module 34.

For example, in the event the vehicle has achieved 500 miles, the device 22 may transmit (e.g., audibly or visually)

the number of near miss events and/or the associated speed at which the vehicle was traveling for viewing by the primary driver. This information gives the primary driver the opportunity to discuss the occurrence of the near miss events and to counsel the secondary driver to become a better driver. The device 22 may assign ratings or metrics based on these detected events. In the event the incidents are detected to have occurred at high speeds, a poor rating may be assigned. In the event the incidents are detected to have occurred at lower speeds, then a high rating may be assigned. The device 22 automatically assigns an automatic low rating in the event the near miss events occur while the secondary driver is detected to be on the phone.

A seatbelt status controller (SSC) 38 may be operably coupled to the RCM 36. While FIG. 1 illustrates that the SSC 38 is positioned within the RCM 36, it is contemplated that the SSC 38 may be positioned exterior to the RCM 36. The SSC 38 cooperates with the device 22 to notify the driver that one or more seatbelts in the vehicle have not been fastened, or are in an unbuckled state. Various examples that describe the operation of the SSC 38 may be found in U.S. Pat. No. 6,278,358 to Spoto et al; U.S. Pat. No. 6,362,734 to McQuade et al.; and U.S. Pat. No. 6,501,374 to King et al.

One or more buckle switches 40 are operably coupled to the SSC 38 and generally presents data indicative of whether the driver and/or passenger's in the vehicle are in a buckled or unbuckled state. Cameras (not shown) or an occupant classification system may be operably coupled to the SSC 38 to identify the occupants in the vehicle to the SSC 38.

The SSC 38 transmits a signal BLT_STS to provide seatbelt buckle status for the occupants detected in the vehicle. The SSC 38 and/or the device 22 are configured to visually or audibly notify the occupants in the vehicle that one or more seatbelts in the vehicle are not fastened when the ignition is in the run position and/or the vehicle speed is detected to be above a predetermined speed threshold (e.g., 0 mph or other suitable variant).

The device 22 monitors belt usage by recording the number of times the secondary driver is given an audible or visual warning that the seatbelts are not buckled when the ignition is detected to be in the run position and/or the vehicle speed is detected to be above the predetermined speed threshold. The device 22 monitors and reports the belt warning events in response to the vehicle achieving the predetermined distance interval.

The device 22 provides belt usage for the secondary driver at the expiration of each predetermined distance interval. The device 22 may automatically indicate whether the belt status for the secondary driver is in the unbuckled state and whether the secondary driver is on the phone while the vehicle is moving.

An adaptive cruise control (ACC) module 42 is operably coupled to the device 22. The ACC module 42 is generally configured to detect when the vehicle may be on a path that leads to a forward collision (FC). The ACC module 42 is operably coupled to radars (not shown) to detect the presence/proximity of a vehicle that may engage in a forward collision with the vehicle. The device 22 generally issues warnings (audible and/or visual) to the driver in the event the vehicle is detected to be on course or on a path that may lead to a forward collision so that the driver can take corrective action. In the event the ACC module 42 detects that the vehicle is on a path that may lead to a forward collision, the ACC module 42 transmits a signal FCW_EVENT to the device 22 so that the device 22 triggers an alert.

The ACC module 42 may also detect whether the vehicle is in a "tailgating mode" with respect to a vehicle positioned ahead of the current vehicle. The ACC module 42 uses the radars to determine whether the vehicle is in the tailgating mode. It is known in the art to use radars to detect the proximity of the vehicle. Such features will not be described further. The device 22 issues a warning (audible and/or visual) to the driver in the event the vehicle is detected to be tailgating another vehicle. The alert notifies the driver that the vehicle may be too close to the forward vehicle. In the event the vehicle is detected to be in the tailgating mode with respect to a forwardly positioned vehicle, the ACC module 42 transmits a signal TAILGATE to the device 22 so that the device 22 triggers an alert. The FCW and tailgate warning may be issued once the vehicle is detected to be traveling above a predetermined vehicle speed. For example, the ACC module 42 may monitor for FCW and tailgate events if the vehicle speed is above 25 mph or other suitable vehicle speed. The particular speed threshold for monitoring FCW and tailgate events may vary.

The device 22 may record the number of FCW warnings and tailgate events that were generated for the secondary driver for each predetermined distance interval. The device 22 reports out (e.g., visually and/or audibly) the number of FCW warnings and tailgating warning issued to the secondary driver for that particular predetermined distance interval. The device 22 receives the signal TAILGATE and/or FCW_EVENT and correlates other factors such as, but not limited to, data/time, speed, number of passengers, buckle status for driver and passenger(s) and/or phone status at the time the potential collision event occurred. The primary driver can view the recorded events and discuss with the secondary driver. The device 22 may assign ratings for each incident detected (e.g., good, needs improvement, and poor). Again, any incident detected while the driver is on the phone is assigned an automatic poor rating.

A lane departure warning (LDW) module 44 is operably coupled to the device 22. The LDW module 44 uses a forward pointing camera (not shown) to determine what side of the vehicle is deviating from a lane or crossing over the lane to issue a warning. The LDW module 44 transmits a signal LDW to the device 22 so that the device generates an audible and/or visual warning for the driver.

The LDW module 44 is also configured to detect a shift in the driver's performance that may cause the vehicle to leave a lane or head off of the road. For example, the LDW module 44 measures a Driver's Impairment Monitor (DIMON) and assigns a rating to it. The DIMON tracks vehicle variation within the lane. In general, the LDW module 44 monitors the DIMON to detect a shift in the driver's performance that may be attributed to the driver exhibiting a drowsy or sleepy condition. In the event the DIMON rating is high, the LDW module 44 may transmit a signal DIMON to the device 22 so that the device 22 visually and/or audibly notifies the driver that the vehicle is veering off of the road at an early stage so that the driver can regain control of the vehicle prior to collision or other failure mode.

The device 22 may record the number of LDW events and/or DIMON events that were generated for the secondary driver at each predetermined distance interval. The device 22 reports out (e.g., visually and/or audibly) the number of LDW events and the DIMON events for the secondary driver at each predetermined distance interval. The device 22 receives the signals LDW and/or DIMON and correlates other factors such as, but not limited to, data/time, speed, number of passengers, buckle status, and/or phone status at the time the potential collision event occurred. The primary driver can view the recorded events and discuss accordingly with the secondary driver. The device 22 may assign ratings for these detected events. Again, any incident detected while the vehicle is being driven and while the secondary driver is on the phone may be assigned a low rating.

The camera(s) used for the LDW system can also be used in connection with the ESC, RCM, and/or ACC systems. For example, in the event the ESC, RCM, and/or ACC systems detect events, the camera can be controlled to record data 5 seconds before and after such events are detected of the forward portion of the vehicle. In general, the LDW module 44 temporarily stores all of the data captured by the camera and simply records the data five seconds ahead of the occurrence of the LDW event and after the LDW event. The device 22 may transmit a signal RQST_VIDEO to the LDW module 44 in response to determining the occurrence of an ESC, RCM, tailgate, and FCW event. The LDW module 44 can transmit a signal VIDEO to the device 22 so that one or more potential collision events can be viewed by the primary driver. In general, the potential collision events are generally defined as all events detected by the ESC module 34, the RCM module 36, the ACC module 42, the LDW module 44 and/or a blind spot monitoring (BSM) module 46.

The blind spot monitoring (BSM) module 46 is operably coupled to the device 22. The BSM module 46 is configured to determine whether a vehicle is in or entering into a detection zone to either side (e.g., left or right side) of the vehicle. The BSM module 46 provides an alert to the driver when a vehicle is overtaking the subject vehicle (i.e., the vehicle referenced to include the BSM module 46) or is stagnating within the detection zone. The BSM module 46 transmits a signal BSM to the device 22 so that the device 22 generates a warning (e.g., audible and/or visual) to the driver. The warning is intended to notify the driver that a vehicle is located in the detection zone of the target vehicle.

In general, the device 22 uses the signal LDW and the signal BSM to monitor for space management events. For example, the LDW module 44 is configured to trigger and event if the vehicle departs from either a left or right side of the lane and the BSM module 46 provides an alert to notify the driver that a vehicle is in the detection zone. The device 22 uses such alerts to monitor for space management events. The primary driver can view the recorded events and discuss accordingly with the secondary driver. The device 22 may assign ratings for these detected events. The device 22 can correlate space management event to other factors such as but not limited to date/time, speed, number of passengers, buckles status, and/or phone status at the time the potential collision occurred. Again, any incident detected while the secondary driver is on the phone is assigned an automatic poor rating.

A video module 47 is operably coupled to the device 22. The video module 47 may be installed near the inside rear view mirror. The video module 47 may include one or more cameras aimed at the interior of the vehicle. The camera(s) of the video module 47 temporarily stores the interior activity of the vehicle. Anytime a potential collision alert is generated (via the ESC module 34, the RCM module 36, the ACC module 42, the LDW module 44, and the BSM module 46), the device 22 transmits the signal RQST_VIDEO to the video module 47. In turn, the camera(s) of the video module 47 records the activity in the interior of the vehicle before the event and just after the event and transmits such data on the signal VIDEO_2 (in a similar manner described with the camera of the LDW module 44) so that the primary driver can view and discuss the event with the secondary driver. This feature gives the primary driver the ability to coach the secondary driver so that problematic driving behaviors can be corrected. For example, the primary driver may have noticed that the secondary driver was temporarily distracted with other passengers in the vehicle or for other reasons that are known to be problematic driver behaviors. The primary driver can discuss these behaviors with the secondary driver to ensure that such behaviors are corrected. The event video feature is generally a feature that can be enabled by the primary driver via the device 22. However, the secondary driver is not capable of defeating the feature once enabled by the primary driver.

An auxiliary protocol interface module (APIM) 50 is operably coupled to the device 22. The APIM 50 is configured to receive an occupant communication device (OCD) 54. The APIM 50 is generally part of an in-vehicle communication system which interfaces with the OCD 54 to enable voice input control to perform a function with the OCD 54 so that the driver does not have to enter data directly into the OCD 54. The APIM 50 may interface via switches (not shown) positioned within the vehicle to enable touch selection control to perform a function with the OCD 54 so that the driver does not have to enter data directly into the OCD 54. The OCD 54 is wirelessly coupled to the APIM 50. In one example, the APIM 50 may be implemented as part of the SYNC system developed by Ford Motor Company® and Microsoft® which is known in the art. The OCD 54 may include any number of communication devices that use a wireless protocol. For example, one such wireless protocol may include Bluetooth™. The OCD 54 may use any protocol that is generally situated to facilitate wireless communication. The OCD 54 may be a phone, a text messaging device, a music generating device (such as a phone that plays MP3 songs) whereby all of such items use the Bluetooth™ protocol to communicate. In yet another example, the OCD 54 may include other devices such as Universal Serial Bus (USB) based music playback devices (e.g., Zune™ and iPod® by Apple®). In yet another example, the OCD 54 may include a link that is hardwired coupled into a line-in input provided on the APIM 50. Such a link may receive an input from music playback device to transmit audio via speakers in the vehicle.

In general, the APIM 50 may receive any mobile communication device or digital media player and allow the vehicle occupant to operate such devices via voice input and/or touch input. Switches may be positioned on the APIM 50, the vehicle's steering wheel (not shown), an audio control module (ACM) (not shown), or on the device 22 to enable touch input. In the event the OCD 54 comprises a wireless protocol based text messaging device that is coupled to the APIM 50, the vehicle occupant may be presented with a listing of pre-selected text messages from the APIM 50 for the occupant to select via touch input and/or voice input to transmit the selected text to another user.

The APIM 50 enables the driver to perform functions with the OCD 54 by receiving voice input commands or touch selection via the switch so that the driver does not have to enter various selections directly with the OCD 54. It is generally preferable that drivers avoid entering data or making selections via buttons positioned directly on the OCD 54. It is known that a driver may be distracted while driving when inputting data or selecting buttons on the OCD 54. Such distractions may be avoided if the driver controls the OCD 54 via the voice command capability or the switch selection features offered by the vehicle. The APIM 50 may recognize any number of voice inputs to control the OCDs 54 to perform a particular function (e.g., place phone call, dial a particular number, adjust volume, turn on/off OCD 54, or any other foreseeable operation generally performed by the particular OCD 54). In addition, an occupant may enter data (e.g., the actual phone number or actual text) as a voice input followed by a command to dial the number via voice input. The driver via the switches may also perform one or more of the operations noted directly above.

In general, the APIM 50 provides a mechanism for enabling the primary driver or the secondary driver to control the OCD 54 so that the driver is not required to perform selections via the switches/buttons positioned directly on the OCD 54. In order for the driver to use voice command capability or the switch selection features offered by the APIM 50 and/or the switches on the vehicle, it is necessary for the driver to electronically couple (or pair) his/her OCD 54 to the APIM 50 to enable the primary or secondary driver to control the OCD 54 via the voice control or switch selection on the vehicle. The driver may if desired, choose not to couple or pair his/her OCD to the APIM 50. The APIM 50 transmits a signal PAIR_STATUS to the device 22 which is indicative of whether the driver has paired his/her OCD 54 to the APIM 50.

The APIM 50 is configured to also monitor when a call occurred and the length of call performed by the secondary driver. The APIM 50 transmits a signal OCD_USAGE to the device 22. The device 22 can correlate the date/time as to when a call was made/received (on in a phone session) and cross-reference to one or more of the recorded events noted above.

The device 22 may record the number of times the OCD 54 was not paired to the APIM 50 and the overall phone usage for the secondary driver at each predetermined distance interval. The device 22 reports out (e.g., visually and/or audibly) the pair status for the OCDs 54 belonging to the secondary driver and the phone usage for secondary driver at the expiration of each predetermined distance interval. The primary driver can view the pair status and the phone usage and discuss accordingly with the secondary driver. The device 22 may assign ratings or other metrics for pair status and/phone usage detected.

The device 22 may generate the report that details various recorded events and profiles for the secondary driver and transmit the same over a signal REPORT to the APIM 50. The APIM 50 may transmit the report over an output link 53 via the driver's OCD 54 to be uploaded into a server (not shown) so that the primary driver can review the same over a computer. Methods that can be used to wirelessly transmit data from the vehicle with the link 53 may include, but not limited to, voice over data (such as but not limited to, services provided by Airbiquity®, data channels provided on OCD 54, or Wifi). Alternatively, a USB port 55 (or other suitable communication port) may be positioned in the vehicle so that the primary driver can download the report and profiles generated for the secondary driver as desired.

As also noted above, the device 22 may include a display so that the reports and corresponding usage ratings can be viewed therefrom. In addition, the device 22 can co-act with the APIM 50 to provide automated e-mails to the primary driver or the secondary driver that contain the event reports after a corresponding report is generated. The primary driver and/or the secondary driver can setup an automated e-mail generation via the device 22. Further, the device 22 may transmit the signal VIDEO_1 to the APIM 50 which corresponds to the recorded information by the camera(s) in the LDW module 44 that can be uploaded to a server and then later downloaded into a personal computer or other suitable mechanism. Likewise, the device 22 may transmit the signal VIDEO_2 to the APIM 50 which corresponds to the recorded information by the camera(s) in the video module 47 that can be uploaded to a server and then later downloaded into a personal computer or other suitable mechanism.

As further noted above, each report generally corresponds to recorded events that occur over a predetermined distance interval. Once the predetermined distance interval is detected to have expired (e.g., distance value is equal to predetermined value signal), the device 22 generates a report that corresponds to that particular predetermined distance interval. Older reports can be archived in the device 22, or simply removed from the device 22 and stored in a device such as a personal computer belonging to either the primary or the secondary driver. Such reports may be suitable for presentation and may be used as evidence to support a claim made by the primary driver that the secondary driver may be entitled to lower insurance rates. The primary driver (and/or the secondary driver) may interface with the device 22 at any time to control the device 22 (via the switches 26 or voice command 27) to view current statistics (even though the expiration of the predetermined distance interval has not yet occurred). The current statistics will be discussed in more detail below. The primary driver has the option of activating the event recording and reporting feature for the secondary driver via the switches 26 or voice command 27 of the device 22. The secondary driver is not capable of disabling the event reporting and reporting feature once the feature is set by the primary driver.

The APIM 50 (e.g., via the OCD 54 and the link 53) may also transmit the generated event reports to (via the signal REPORT in a wireless format) an award center (server) 56 located remote from the vehicle so that awards can be determined and issued based on the information contained in the generated reports. In one example, the primary driver may subscribe to an awards program via the SYNC-MY-RIDE® website so that awards are given to the secondary driver for good driving habits as exhibited by the generated event reports. Points may be generated and tracked on the website based on demonstrated good driver behavior. The secondary driver is capable of redeeming prizes/awards via the website based on the number of points generated. The awards center 56 may allow the secondary driver to redeem prizes therefrom such as, but not limited to, free music downloads, free prizes/gifts, discounts to various entertainment functions or satellite radio subscription. In yet another example, the device 22 may compare data contained within the reports and compare to preselected criteria and allow the secondary driver to redeem awards directly at the vehicle. For example, an ambient lighting control system 60 may be coupled to the device 22 so that the device 22 may allow the secondary driver to select various ambient lighting color schemes used throughout the vehicle as an award. Ambient lighting color modules are known to exist in vehicles and will not be described further. The device 22 may allow the secondary driver to select one or more of such schemes if not originally offered to the secondary driver as an award for good driving habits.

Figure 2:
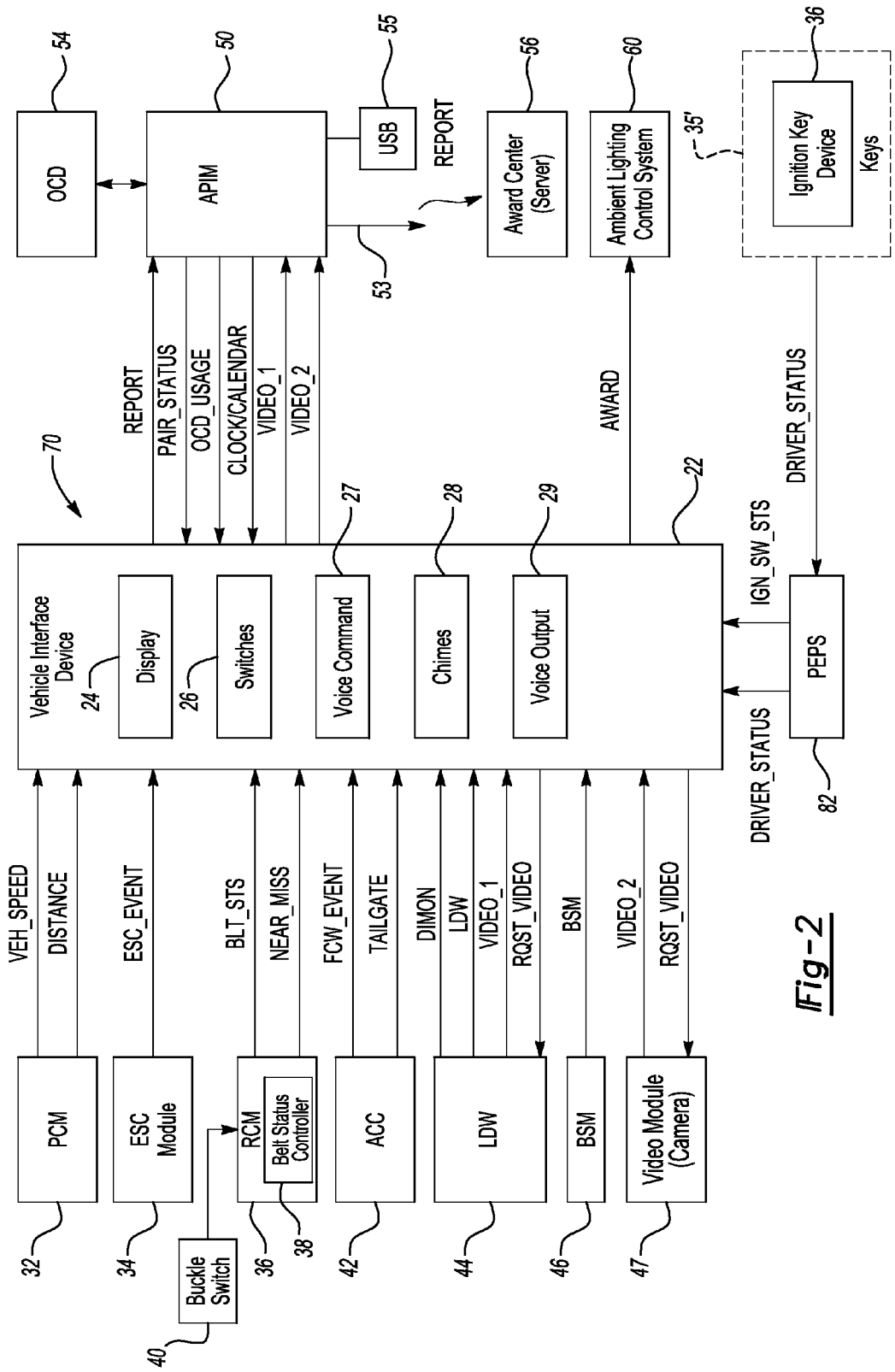
FIG. 2 depicts another system for differentiating between primary and secondary drivers of a vehicle and for recording vehicle events based on the status of the driver in accordance to one embodiment of the present invention.

FIG. 2 depicts a system 70 for differentiating between primary and secondary drivers of a vehicle and for recording vehicle events based on the status of the driver in accordance to one embodiment of the present invention. The system 70 implements a passive entry passive start function to gain entry into and to start the vehicle as opposed to the PATS system that is used for the system 20 for starting the vehicle. A passive entry passive start (PEPS) controller 82 may be operably coupled to the device 22. While FIG. 2 generally illustrates that the PEPS controller 82 is positioned external to the device 22, additional implementations may include positioning the PEPS controller 82 within the device 22. The particular placement of the PEPS controller 82 with respect to the device 22 may vary based on the desired criteria of a particular implementation.

In general, the PEPS function is a keyless access and start system. The driver may carry one or more keys 35' that may be in the form of an electronic transmission device. The keys 35' each include the ignition key device 36 embedded within for communicating with the PEPS controller 82. The transponder of the ignition key device 36 is adapted to send the electronic code as the signal DRIVER_STATUS to the PEPS controller 82. To gain access or entry into the vehicle with the keys 35' in the PEPS implementation, the driver may need to wake up the PEPS controller 82 to establish bi-directional communication between the keys 35' and the PEPS controller 82. In one example, such a wake up may occur by requiring the driver to touch and/or pull the door handle (not shown) of the vehicle. In response to the door handle being toggled or touched, the PEPS controller 82 may wake up and transmit RF based signals to the keys 35'. The PEPS controller 82 and the keys 35' may undergo a series of communications back and forth with each other (e.g., handshaking) for vehicle access authentication purposes. The PEPS controller 82 may unlock the doors in response to a successful completion of the handshaking process. Once the driver is in the vehicle, the driver may simply press a button (not shown) positioned on an instrument panel to start the vehicle.

In one example, the system 70 may be adapted to tag or associate the keys as either a primary or a secondary key during a learn operation as discussed with the PATS controller 30. In yet another example, the system 70 may be configured to associate the keys 35' as primary or secondary keys in the manner identified and disclosed in one or more of the following U.S. patent Ser. No. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; Ser. No. 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; and Ser. No. 12/992,397 entitled "SYSTEM AND METHOD FOR CONTROLLING AN ENTERTAINMENT DEVICE IN A VEHICLE BASED ON DRIVER STATUS AND A PREDETERMINED VEHICLE EVENT" and filed on Nov. 12, 2010. The PEPS controller 82 may determine the driver status based on the information indicated on the signal DRIVER_STATUS as noted in connection with the system 20 of FIG. 1.

The PEPS controller 82 is adapted to provide the signal DRIVER_STATUS_1 to the various controllers over the communication bus. The signal DRIVER_STATUS_1 corresponds to whether the driver is the primary driver or the secondary driver. The PEPS controller 82 may also transmit the signal IGN_SW_STS to the device 22. The PEPS controller 82 determines that the key ignition status is in the run position in response to the driver toggling the brake pedal (not shown) and depressing the start switch. In such a case, the vehicle is started and the PEPS controller 82 transmits the signal IGN_SW_STS as being in the run state. In the event the driver selects only the start button, the PEPS controller 82 transmits the signal IGN_SW_STS as being in the accessory state.

While FIGS. 1-2 generally disclose keys 35 and 35' are used in connection with the PATS and PEPS implementations, respectively, it is generally contemplated that the keys may be implemented as a cell phone or other suitable switch device used to authenticate the driver to the vehicle for enabling entry into the vehicle or for starting the vehicle. Data transmitted from the cell phone may be received by a receiver (not shown) on the vehicle and decoded to perform driver authentication for gaining entry into the vehicle, starting the vehicle, and ascertaining driver status.

The device 22 is configured to record vehicle events based on signals transmitted from the PCM 32, the ESC module 34, the RCM module 36, the ACC module 42, the LDW module 44, the BSM module 46, the video module 47 and the APIM 50 as noted in connection with FIG. 1. The device 22 records the vehicle events and generates an event report upon detecting the expiration of the predetermined distance interval. The device 22 is configured to visually/audibly transmit the report to either the primary driver or the secondary driver. In addition, the device 22 is further configured to transmit the report on the signal REPORT to the APIM 50 so that such information can be transmitted or uploaded to a server for retrieval by either the primary driver or the secondary driver. Further, the device 22 can co-act with the APIM 50 to provide automated e-mails to the primary driver or the secondary driver that contain the event reports after a corresponding report is generated. The primary driver and/or the secondary driver can setup an automated e-mail function via the device 22. The report can also be downloaded via a communication interface such as Bluetooth® or another suitable interface. In general, the system 70 is configured to provide or perform similar functions/operations with respect to the event recording/tracking and reporting as discussed in connection with the system 20 of FIG. 1.

Figure 3:
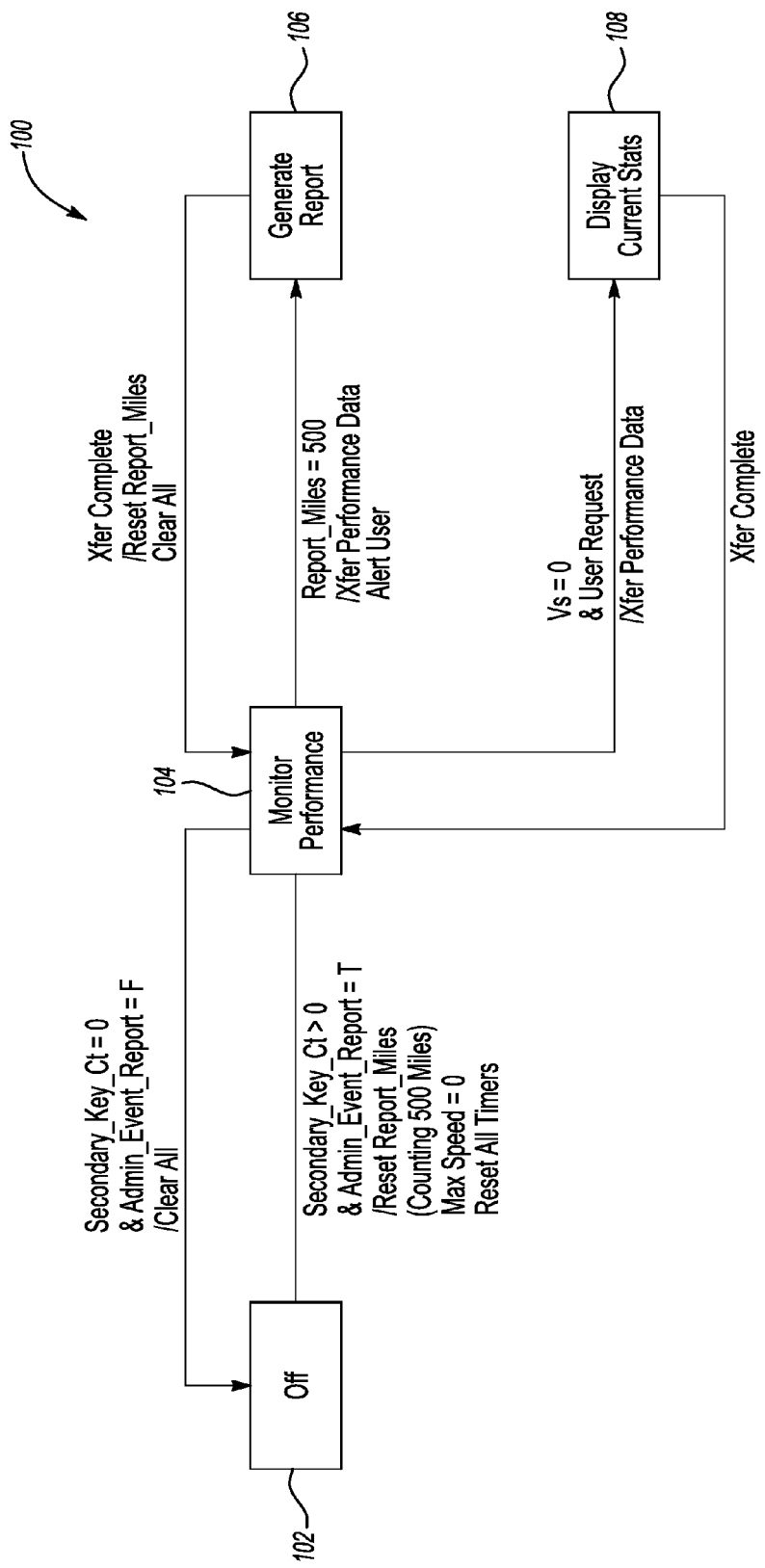
FIG. 3 depicts a diagram that illustrates the manner in which events are recorded for the secondary driver in accordance to one embodiment of the present invention.

FIG. 3 depicts a diagram 100 that illustrates the manner in which events are recorded for the secondary driver.

At state 102, the device 22 is in a wait state. The state 102 moves to state 104 in response to detecting that the driver of the vehicle is the secondary driver and the primary driver has enabled the event-recording feature for the secondary driver. Prior to the entering the state 104, the device 22 resets the predetermined distance interval so that the recording starts at 0 miles. The device 22 resets all applicable timers as well. Such times will be discussed in more detail below.

At state 104, the device 22 receives, monitors and records events that occur while the secondary driver is detected to be the driver of the vehicle (e.g., device 22 monitors inputs from the PCM 32, the ESC module 34, the RCM 36, the ACC module 42, the LDW module 44, the BSM module 46, the video module 47, and the APIM 50). The device 22 moves from state 104 to state 106 if the device 22 detects that the predetermined distance interval has been attained (e.g., the vehicle has driven 500 miles by the secondary driver). The device 22 may issue an alert to notify the driver that a report is ready to be generated. The state 104 moves to state 108 in response to the device 22 detecting that the vehicle speed is zero and that the driver has requested that the device 22 display the current recorded events via the switches 26 or the voice command 27. The device 22 moves from state 104 to state 102 in response to detecting that the primary driver has removed the secondary status of the key or has disabled the event reporting feature via the device 22.

At state 106, the device 22 generates the report based on the recorded events by formatting the data obtained to prepare it for presentation. The device 22 moves from state 106 back to state 104 after the report has been successfully formatted and generated. The device 22 resets the predetermined distance interval to start at zero miles.

At state 108, the device 22 may display the current recorded stats with respect to the recorded events. The device 22 may also transfer the current recorded stats over the signal REPORT to the APIM 50 so that the APIM 50 provides a preliminary report (e.g., file download/transfer to storage device or server). The device 22 moves from state 108 back to state 104 after the transfer of the current recorded stats is complete.

FIGS. 4a-4h generally depicts more details regarding the manner in which the device 22 monitors performance for the secondary driver as noted above in connection with state 104.

Figure 4A:
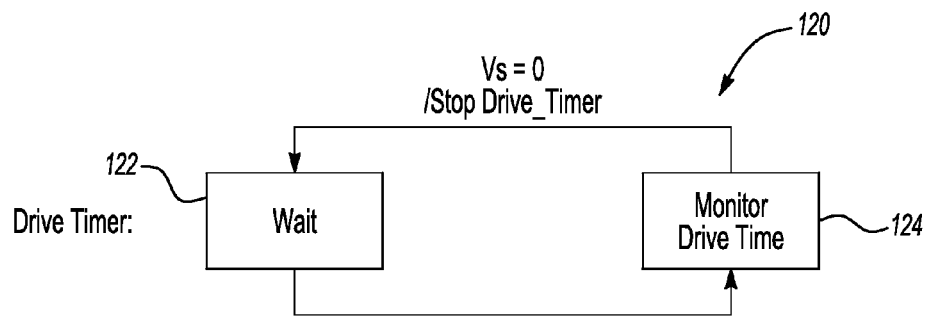
FIGS. 4a-4h generally depict more detailed implementations regarding the manner in which the device records events for the secondary driver.

FIG. 4a depicts a state diagram 120 for monitoring drive time for the secondary driver. At state 122, the device 22 is in a wait state. The device 22 moves from state 122 to 124 in response to detecting that the vehicle speed is above zero or other suitable value.

At state 124, the device 22 measures or monitors the amount of time the vehicle is driven by the secondary driver. The device 22 moves back to state 122 in response to determining that the vehicle speed is equal to zero (or below the threshold). In state 124, the device 22 records the drive time for the secondary driver. The recorded drive time is generally defined as Drive_Timer. The relevance of the drive time for the secondary driver will be discussed in more detail below.

Figure 4B:
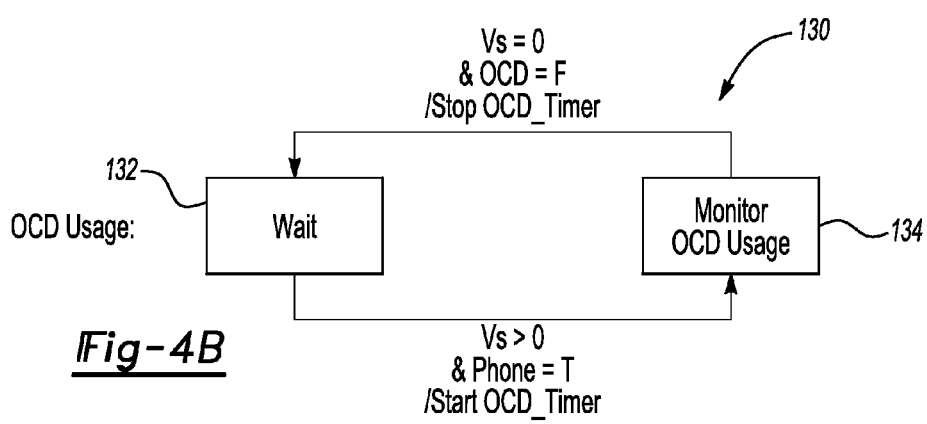

FIG. 4b depicts a state diagram 130 for monitoring OCD usage for the secondary driver. The OCD usage as used in connection with the state diagram corresponds to the amount of time the secondary driver is detected to be on the OCD 54 while driving the vehicle.

At state 132, the device 22 is in a wait state. The device 22 moves from state 132 to state 134 in response to detecting that the vehicle speed is greater than zero (or other suitable value) and that the secondary driver is using the OCD 54 to communicate via the APIM 50.

At state 134, the device 22 records the amount of time the secondary driver uses the OCD 54 to communicate via the APIM 50 (e.g., which is defined as OCD_Timer). The device 22 moves from state 134 back to state 132 in response to determining that the vehicle speed is equal to zero or that the OCD 54 is no longer being used for communication purposes. The OCD usage that will be recorded and reported for every predetermined distance interval is defined by the following equation:

OCD usage=OCD_Timer/Drive_Timer

The OCD usage portion when reported out to the driver is intended to assign a lower rating when the secondary driver is using the OCD 54 while driving the vehicle. The secondary driver can achieve higher ratings if he/she uses the OCD 54 via the APIM 50 for short periods of time while driving the vehicle at slower speeds. The highest rating in the OCD usage category would correspond to the secondary driver not using the OCD 54 at all, or to using the OCD 54 when the vehicle is not moving.

Figure 4C:
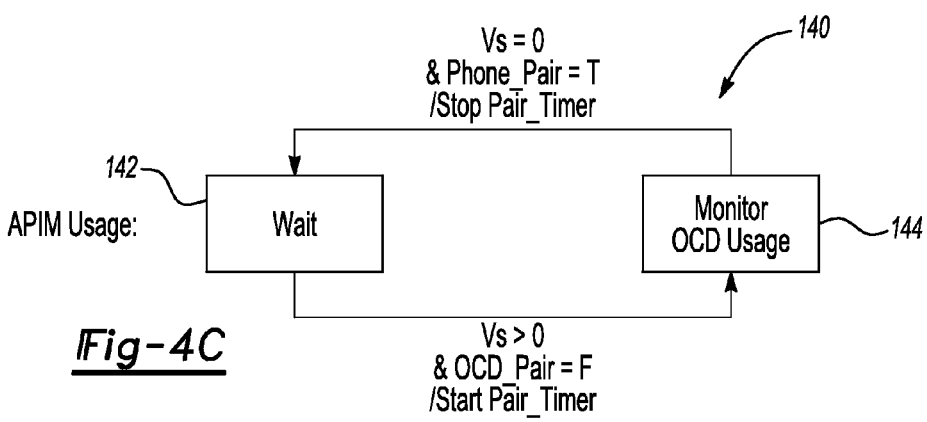

FIG. 4c depicts a state diagram 140 for monitoring pair usage for the secondary driver. The pair usage generally corresponds to the amount of time the secondary driver has not paired the OCD 54 to the APIM 50 while driving the vehicle.

At state 142, the device 22 is in a wait state. The device 22 moves from state 142 to state 144 in response to detecting that the vehicle speed is greater than zero (or other suitable value) and that the OCD 54 has not been paired to the APIM 50.

At state 144, the device 22 records the amount of time in which the secondary driver has not paired his/her OCD 54 to the APIM 50 while the vehicle is traveling at a speed of greater than zero mph (e.g., which is defined as Pair_Timer). The device 22 moves from state 144 back to state 142 in response to determining that the vehicle speed is equal to zero mph or that the OCD 54 is paired to the APIM 50.

The pair usage that will be recorded and reported for every predetermined distance interval is defined by the following equation:

Pair usage=1−(Pair_Timer/Drive_Timer)

The pair usage portion when reported out to the driver is intended to assign a lower rating when the secondary driver does not have his/her OCD 54 paired to the APIM 50 and while the vehicle is moving. Such a condition may be indicative of the secondary driver using the buttons directly on the OCD 54 to communicate while driving the vehicle as opposed to using the voice control option and/or switches associated with the APIM 50 to enable communication. As noted above, it may be preferable to have the secondary driver use the voice control option or switching option via the APIM 50 to communicate with the OCD 54 as opposed to using buttons directly on the OCD 54.

The secondary driver can achieve higher ratings if he/she pairs his/her OCD 54 to the APIM 50 for longer periods of time while driving the vehicle. The highest rating in the phone usage category would correspond to the secondary driver having the OCD 54 being paired to the APIM the entire time the vehicle is moving.

Figure 4D:
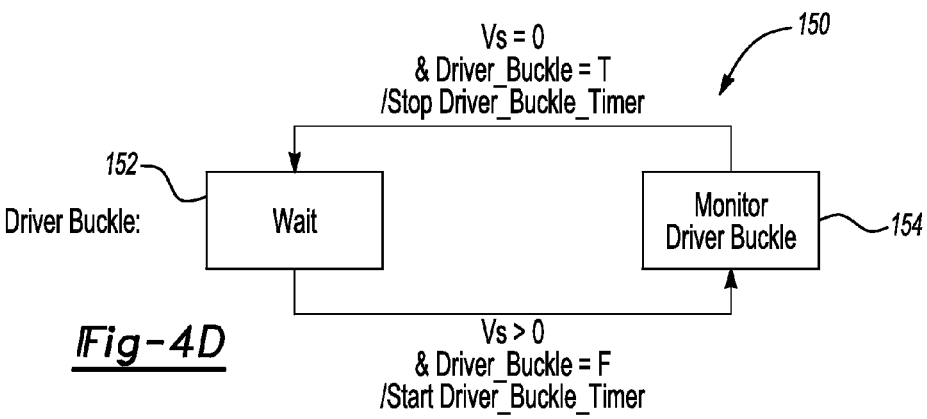

FIG. 4d depicts a state diagram 150 for monitoring driver buckle usage for the secondary driver. The driver buckle usage profile generally corresponds to the amount of time the secondary driver is buckled with a seatbelt while the vehicle is being driven.

At state 152, the device 22 is in a wait state. The device 22 moves from state 152 to state 154 in response to detecting that the vehicle speed is greater than zero (or other suitable value) and that seat belt buckle for the secondary driver has not been fastened.

At state 154, the device 22 records the amount of time in which the secondary driver has not buckled his/her seatbelt while the vehicle is traveling at a speed of greater than zero mph (e.g., which is defined as Driver_Buckle Timer). The device 22 moves from state 154 back to state 152 in response to determining that the vehicle speed is equal to zero mph or when the secondary driver has buckled his/her seatbelt.

The driver buckle usage profile that will be recorded and reported for every predetermined distance interval is defined by the following equation:

Drive Belt Usage=1−(Driver_Buckle_Time/Drive_Timer)

The driver buckle usage profile when reported out to the driver is intended to assign a lower rating when the secondary driver does not have his/her seat belt buckled while the vehicle is moving. The rating is not adverse if the secondary driver is in an unbuckled state when the vehicle is stationary or when the vehicle is moving at very slow speeds. The secondary driver may achieve a high rating if he/she keeps the seat belt buckled at all times when the vehicle is moving.

Figure 4E:
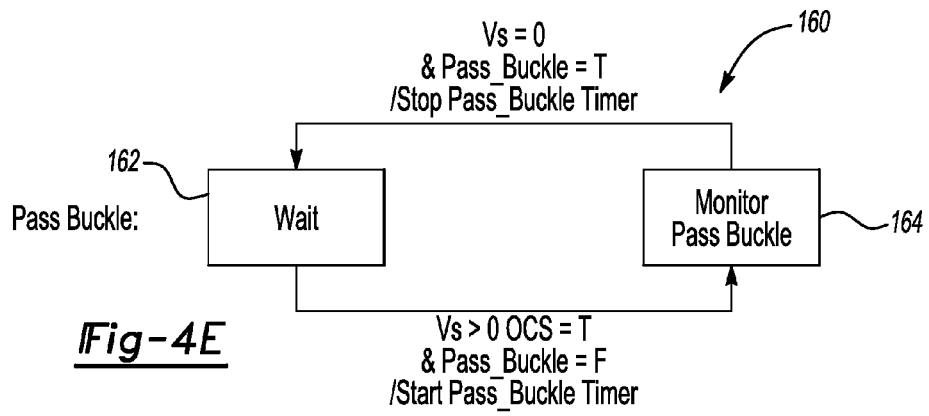

FIG. 4e depicts a state diagram 160 for monitoring buckle usage for a passenger of the secondary driver. The state diagram 160 is executed when the passenger is detected to be present in the vehicle. The passenger buckle usage profile generally corresponds to the amount of time the passenger(s) to the secondary driver is buckled with a seatbelt while the vehicle is being driven.

At state 162, the device 22 is in a wait state. The device 22 moves from state 162 to state 164 in response to detecting that the vehicle speed is greater than zero (or other suitable value) and that seat belt buckle for the passenger(s) of the secondary driver has not been fastened.

At state 164, the device 22 records the amount of time in which the passenger(s) has not buckled his/her seatbelt while the vehicle is traveling at a speed of greater than zero mph (e.g., which is defined as Passenger_Buckle_Timer). The device 22 moves from state 164 back to state 162 in response to determining that the vehicle speed is equal to zero mph or when the passenger has buckled his/her seatbelt.

The passenger buckle usage profile that will be recorded and reported for every predetermined distance interval is defined by the following equation:

Pass Belt Usage=1−(Pass_Buckle_Time/Drive_Timer)

The passenger buckle usage profile when reported out to the driver is intended to assign a lower rating when the passenger to the secondary driver does not have his/her seat belt buckled while the vehicle is moving. The rating is not adverse if the passenger is in an unbuckled state when the vehicle is stationary or when the vehicle is moving at very low speeds. The secondary driver may achieve a high rating if he/she encourages the passenger to keeps the seat belt buckled at all times when the vehicle is moving.

Figure 4F:
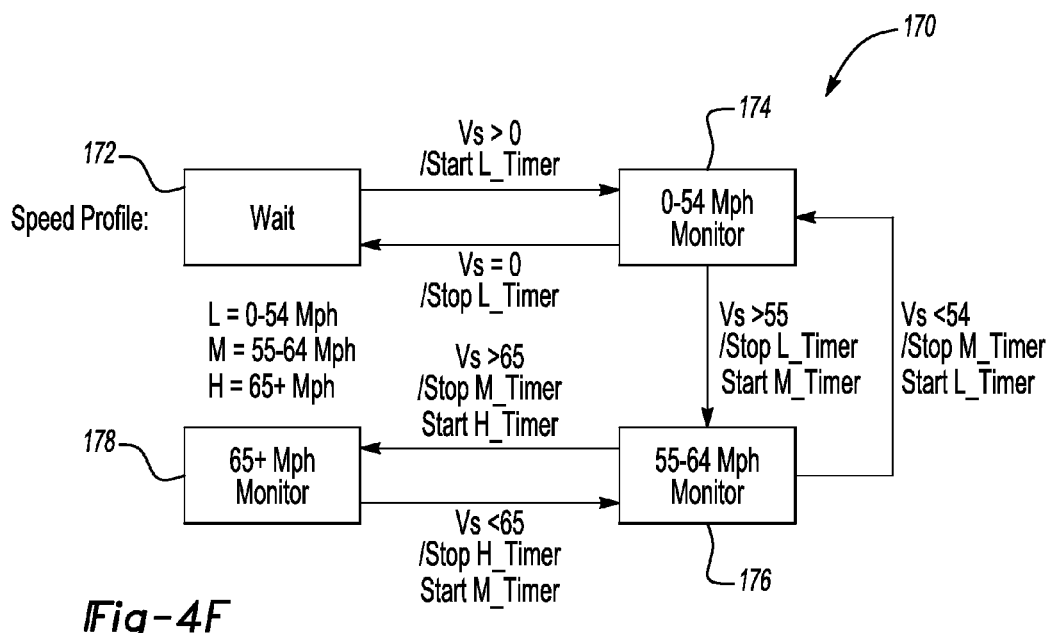

FIG. 4f depicts a state diagram 170 for monitoring the speed profile for the secondary driver. The speed profile generally corresponds to the amount of time the secondary driver drives the vehicle in various speed levels (e.g., between 0-54 mph, 55 mph-64 mph, and greater than 65 mph).

At state 172, the device 22 is in a wait state. The device 22 moves from state 172 to state 174 in response to detecting that the vehicle speed is greater than zero (or other suitable value).

At state 174, the device 22 records the amount of time in which the vehicle is traveling between 0-54 mph (e.g., activates L_timer). The device 22 moves to state 176 in response to detecting that the speed of the vehicle is between 55 mph and 64 mph.

At state 176, the device records the amount of time in which the vehicle is traveling between 55 mph and 64 mph (e.g., activates M_timer) and deactivates L_timer. The device 22 moves to state 178 in response to detecting that the speed of the vehicle is greater than 64 mph.

At state 178, the device 22 records the amount of time in which the vehicle is traveling greater than 65 mph (e.g., activates H_timer) and deactivates M_timer. The device 22 moves back to state 176 in response to detecting that the speed of the vehicle has decreased and is between 55 mph and 64 mph. At state 176, the device 22 deactivates the H_timer and reactivates the M_timer.

The device 22 moves back to state 174 in response to detecting that the speed of the vehicle has decreased and is below 54 mph. At state 174, the device 22 deactivates the M_timer and reactivates the L_timer.

The device 22 moves back to state 172 in response to detecting that the speed of the vehicle is equal to zero. At state 172, the device 22 deactivates the L_timer and enters into the wait state.

The speed profile that will be recorded and reported for every predetermined distance interval for the secondary driver is defined by the following equations:

Time0-54=$L$_timer; % time(0-54)=$L$_timer/driver_timer

Time54-65=$M$_timer; % time(54-65)=$M$_timer/driver_timer

Time66+=$H$_timer; % time(>66)=$H$_timer/driver_timer

The speed profile when reported out to the driver is intended to assign a lower rating when the secondary driver spends a significant portion of time in the high speed profile (e.g., above 65 mph). It is contemplated that the secondary driver may have to speed up in some cases to speeds greater than 65 mph (e.g., pass a truck or other slow moving object on freeway), however the time spend within this speed profile should be kept to a minimum in order to achieve a higher rating. Likewise, the ratings may be adverse if there is a significant portion of time that is attributed to the vehicle traveling between the 55 mph and 64 mph range. Again, it is generally understood that there would probably be more time spent within the 55 mph and 64 mph range than that of range that is greater than the 65 mph, it is anticipated that the highest rating be given to the secondary driver who is able to maximize the greatest amount of time while traveling between 0 and 55 mph.

Figure 4G:
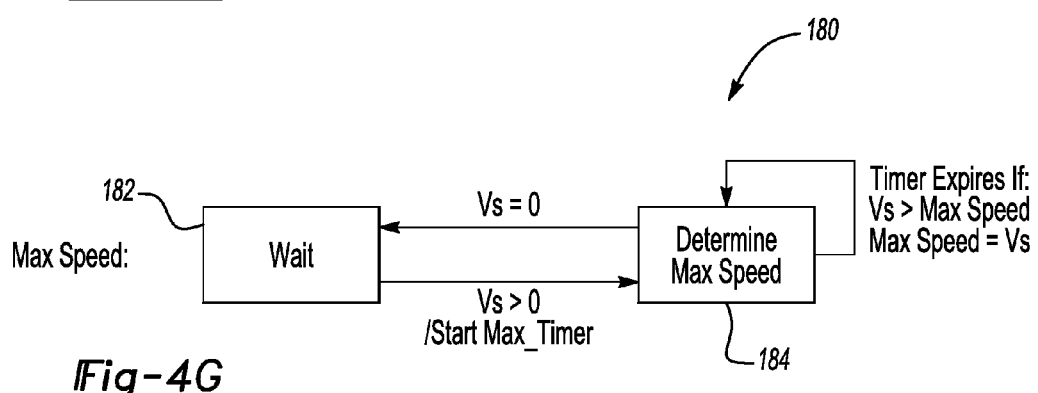

FIG. 4g depicts a state diagram 180 for monitoring the maximum speed for the secondary driver.

At state 182, the device 22 is in a wait state. The device 22 moves from state 182 to state 184 in response to detecting that the vehicle speed is greater than zero (or other suitable value).

At state 184, the device 22 determines the maximum speed (e.g., starts/records Max_Timer) by monitoring all non-zero speeds. The device 22 moves from state 164 back to state 162 in response to determining that the vehicle speed is equal to zero mph.

Figure 4H:
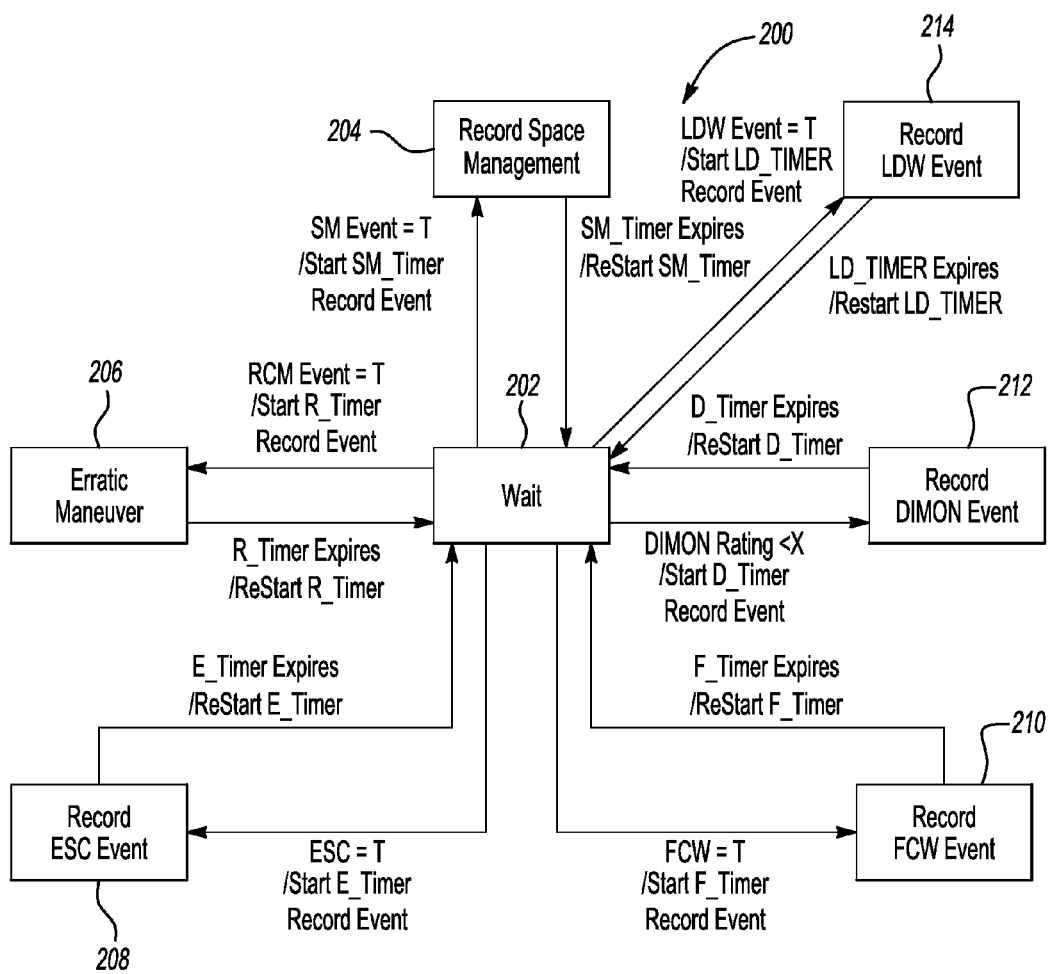

FIG. 4h depicts a state diagram 200 for recording various potential collision events for the secondary driver.

At state 202, the device 22 is in a wait state. The device 22 moves from state 202 to state 204 in response to detecting an occurrence of a tailgating event.

At state 204, the device 22 records an occurrence of the vehicle experiencing the tailgate event when the driven by the secondary driver (the device 22 also records date/time, belt status, and/or phone status in response to detecting the tailgating event). The device 22 starts T_timer in state 204. The device 22 starts T_timer in response to the device 22 detecting an occurrence of the vehicle experiencing a tailgating event. The T_timer may be set to a predetermined time value so that only one violation of a tailgating event is recorded before the T_timer expires. The value used for T_timer is intended to provide some degree of hysterisis so that multiple tailgating events are not recorded when only a single event occurred. It is possible that the ACC module 42 (or other potential collision detection modules disclosed herein) may transmit multiple occurrences of a potential collision event. The intent is not to punish the secondary driver when these multiple events are detected when in reality the event may be tied to a single event. The device 22 moves from state 204 back to state 202 in response to T-time expiring.

The device 22 moves from state 202 to state 206 in response to determining that the vehicle is encountering erratic maneuvers. The device 22 monitors the signal NEAR_MISS to make such a determination.

At state 206, the device 22 records an occurrence of the vehicle experiencing erratic maneuvers (the device 22 also records date/time, belt status, and/or phone status in response to detecting an erratic maneuver event). The device 22 starts R_time in state 206. The device 22 starts R_timer in response to detecting an occurrence of an erratic maneuver event. The R_timer may be set to a predetermined time value so that only one violation of an erratic maneuver is recorded before the R_timer expires. The value used for R_timer is intended to provide some degree of hysterisis so that multiple erratic maneuvers are not recorded when only a single event occurred. The device 22 moves back to state 202 in response to R_timer expiring.

The device 22 moves from state 202 to state 208 in response to the device 22 determining that the vehicle is encountering a stability control event (the device 22 also records date/time, belt status, and/or phone status in response to detecting the stability control event). The device 22 monitors the signal ESC_EVENT to make such a determination.

At state 208, the device 22 records an occurrence of a stability control event (e.g, start/record E_timer). The device 22 starts E_timer. The device 22 starts E_timer in response to detecting an occurrence of the vehicle experiencing a stability control event. The E_timer may be set to a predetermined time value so that only one violation of a stability control event is recorded before the E_timer expires. The value used for the E_timer is intended to provide some degree of hysterisis so that multiple stability control events are not recorded when only a single event occurred. The device 22 moves back to state 202 in response to E_timer expiring.

The device 22 moves from state 202 to state 210 in response to determining that the vehicle is encountering a forward collision event. The device 22 monitors the signal FCW_EVENT to make such a determination.

At state 210, the device 22 records the occurrence of a forward collision event (the device 22 also records date/time, belt status, and/or phone status in response to detecting the forward collision event). The device 22 starts F_timer in response to detecting an occurrence of the vehicle experiencing a forward collision event. The F_timer may be set to a predetermined time value so that only one violation of a forward collision event is recorded before the F_timer expires. The value used for F_timer is intended to provide some degree of hysterisis so that multiple forward collision events are not recorded when only a single event occurred. The device 22 moves back to state 202 in response to F_timer expiring.

The device 22 moves from state 202 to state 212 in response to detecting that the vehicle is encountering a DIMON event. The device 22 monitors the signal DIMON to make such a determination.

At state 212, the device 22 records the occurrence of the DIMON event (the device 22 also records date/time, belt status, and/or phone status in response to detecting the DIMON event). The device 22 starts D_timer in response to detecting an occurrence of the DIMON event. The D_timer may be set to a predetermined time value so that only one violation of a DIMON event is recorded before the D_timer expires. The value used for D_timer is intended to provide some degree of hysterisis so that multiple DIMON events are not recorded when only a single event occurred. The device 22 moves back to state 202 in response to D_timer expiring.

The device 22 moves from state 202 to state 214 in response to detecting that the vehicle is encountering an LDW event. The device 22 monitors the signal LDW to make such a determination.

At state 214, the device 22 records the occurrence of the lane departure event (the device 22 also records date/time, belt status, and/or phone status in response to detecting the lane departure event). The device 22 starts LD_timer in response to detecting an occurrence of the vehicle experiencing a lane departure event. The LD_timer may be set to a predetermined time value so that only one violation of a lane departure event is recorded before the LD_timer expires. The value used for the LD_timer is intended to provide some degree of hysterisis so that multiple lane departure events are not recorded when only a single event occurred. The device 22 moves back to state 202 in response to the LD_timer expiring.

Figure 5:
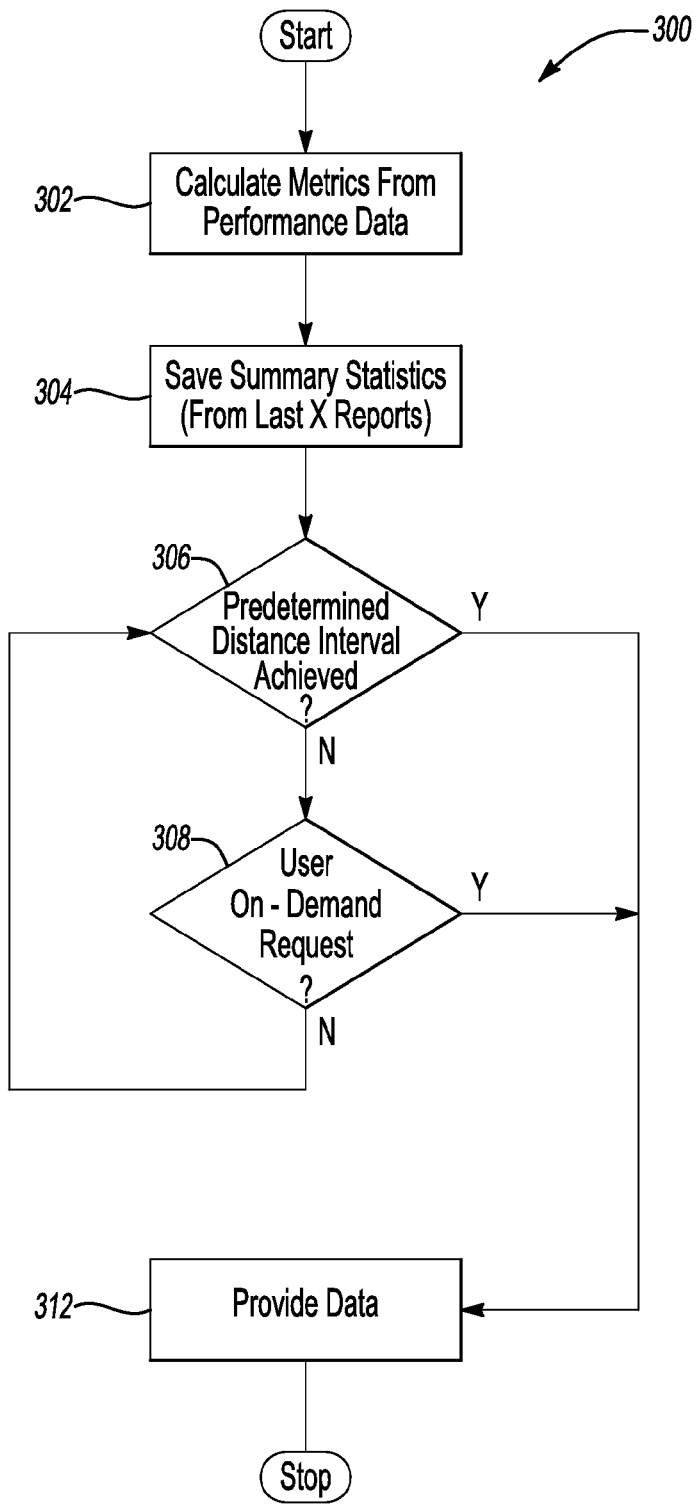
FIG. 5 depicts a method for generating a report for recorded events in accordance to one embodiment of the present invention.

FIG. 5 depicts a method 300 for generating a report which depict recorded events for the secondary driver.

In operation 302, the device 22 records the events as noted above and calculates performance data for the secondary driver. For example, device 22 monitors inputs from the PCM 32, the ESC module 34, the RCM module 36, the ACC module 42, the LDW module 44, the BSM module 46, the video module 47 and calculates performance data as noted above in connection with FIGS. 4a-4h.

In operation 304, the device 22 saves a set of summary statistics from previous reports generated (i.e., older reports generated upon the expiration of earlier predetermined distance intervals). In one example, the device 22 may use data from between 1 and 10 previously generated reports to generate the summary statistics. The particular number of previously generated reports used to generate the summary statistics may vary based on memory requirements or allocation to the device 22.

In operation 306, the device 22 determines whether the vehicle has achieved the predetermined distance interval. For example, the device 22 determines whether the vehicle has been driven by the secondary driver for a 500 mile interval. If the device 22 determines that the vehicle has not achieved the predetermined distance interval, the method 300 moves to operation 308. If the device 22 determines that the vehicle has achieved the predetermined distance interval, the method 300 moves to operation 312.

Figure 8:
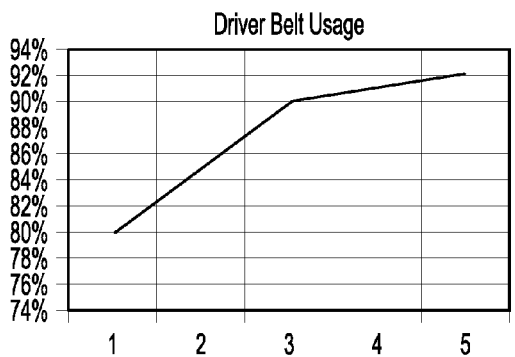
FIG. 8 depicts a summary statistics report which is a summary of a predetermined number of generated reports in accordance to one embodiment of the present invention.
Figure 8:
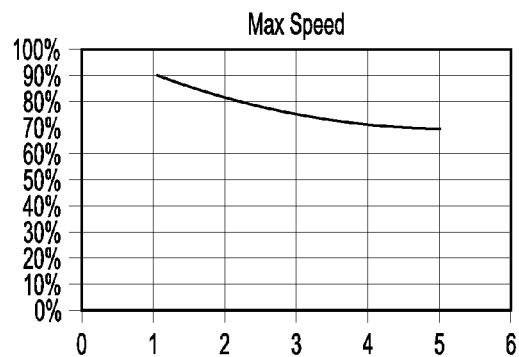
Figure 8:
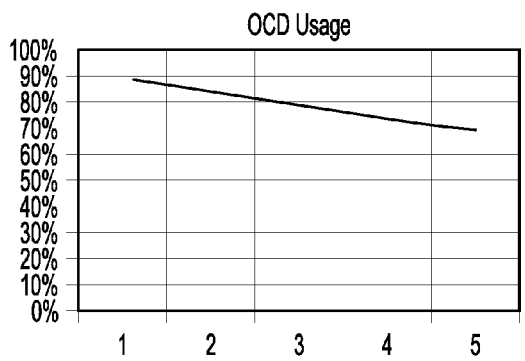
Figure 8:
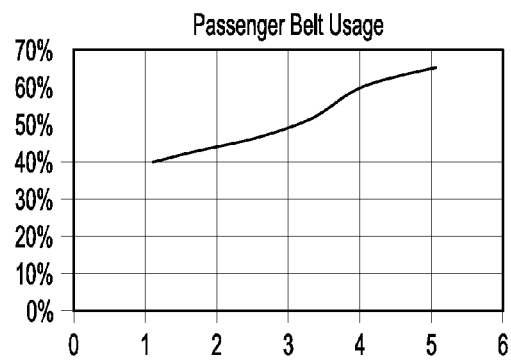

In operation 308, the device 22 determines whether the primary driver (or the secondary driver) has made an on-demand request to view the secondary driver performance. In other words, has the driver selected to see (i) current statistics (without the vehicle achieving the predetermined distance interval). Such statistics will include at least a portion of the information shown in FIGS. 6 and 7 after the last report generated, and/or a summary (summary data obtained from previously generated reports) as shown in FIG. 8. The driver may make a selection via any user interface selection capability provided on the device 22 or via any other switching mechanism located elsewhere on the vehicle. If the device 22 detects that the driver has not made an on-demand request, then the method 300 moves back to operation 306. If the device 22 detects that the driver has made an on-demand request, then the method 300 moves to operation 312.

In operation 312, the device 22 provides data related to the secondary driver. For example, the device 22 may transmit one or more of the current statistics, summary statistic, and/or the completed generated report for the predetermined distance interval report to the APIM 50 via the signal REPORT so that such data is transmitted from the vehicle, uploaded to a server, or e-mailed to the primary driver (and/or the secondary driver if the e-mail feature is enabled) and/or sent to the award center 56 for assessment. In yet another example, the device 22 may display (or audibly notify) the driver of one or more of the current statistics, summary statistics and/or the completed generated report for the predetermined distance interval. In yet another example, the APIM 50 may receive the data from the device 22 and download over a USB interface to a portable memory device.

Figures 6, 7:
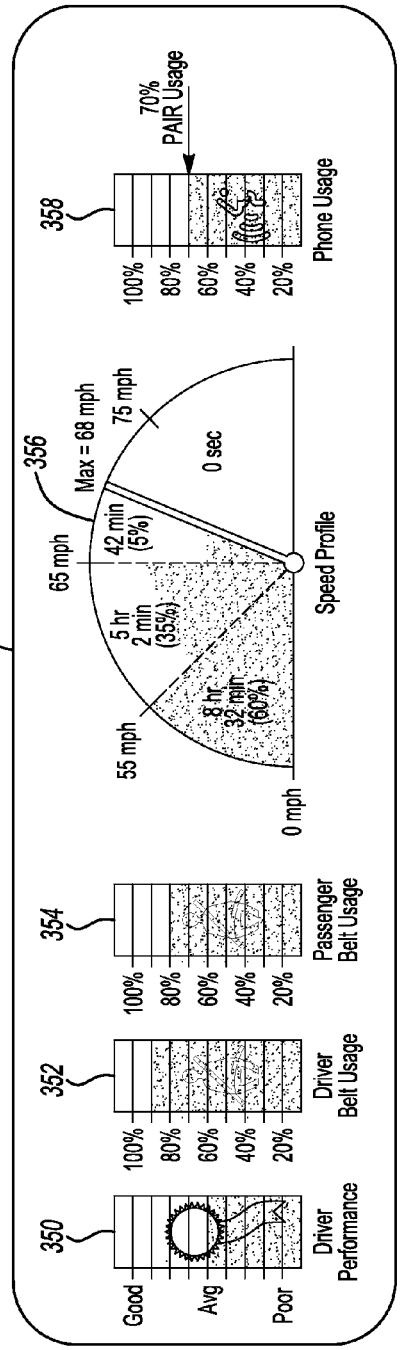
FIG. 6 depicts an example of a visual display that may be provided which illustrates performance data and associated ratings or metrics for the secondary driver in accordance to one embodiment of the present invention.
FIG. 7 depicts a detailed report corresponding to the recorded events for the secondary driver in accordance to one embodiment of the present invention.

FIG. 6 depicts an example of a visual display that may be provided which illustrates various performance data recorded and associated usage ratings or metrics for the secondary driver on the device 22. The display 24 of the device 22 may include a driver performance display 350. The device 22 may generate the driver performance display 350 based on data collected via the state diagram 200 as discussed in connection with FIG. 4H.

For example, the driver performance display may correspond to various potential collision events that have been detected while the secondary driver is detected to be driving the vehicle. In general, the driver performance display 350 is a running summary of specific events recorded by the device 22 (e.g., from inputs received from the ESC module 34, the RCM module 36, the ACC module 42, the LDW module 44, the BSM module 46, and/or the APIM 50). An optional ribbon or other award/recognition symbol may be placed on the display 350 in the event the assigned rating or metric for the secondary driver is average or greater. The display 350 may further include different color fills that depend on the ratings. For example, the color fill may be green if there is an above average rating, the color fill may be yellow if there is a below average rating, and the color fill may be red if there is a rating that is well below average.

The display 24 of the device 22 may include a driver belt usage display 352. The device 22 may generate the driver belt usage display 352 based on data collected via the state diagram 150 as discussed in connection with FIG. 4D. For example, the driver belt usage display 352 may correspond to the percentage of time that the driver uses the seatbelt while the vehicle speed is greater than 0 mph (or other suitable speed). In general, the driver belt usage display 352 is a running summary of belt usage detected by the device 22 (e.g., from inputs received from the PCM 32 and the RCM module 36). The device 22 takes into account vehicle speed while monitoring belt usage for the driver so that the driver is not penalized for removing his/her seatbelt while at a drive thru, car wash, toll booth, etc.

The total area fill within the display 352 is a function of the time driven while the driver is wearing the seatbelt. The color of the fill area within the display 352 depends on the percentage of time the seat belt is used. The color of the fill may be green if a 95% seat belt usage is detected. The color of the fill may be yellow if a seat belt usage of between 90 and 95% is detected. The color fill may be red if a seat belt usage of below 89% is detected.

The display 24 of the device 22 may include a passenger belt usage display 354 (e.g, passenger in the vehicle while the vehicle is being driven by the secondary driver). The device 22 may generate the passenger belt usage display 354 based on data collected via the state diagram 160 as discussed in connection with FIG. 4e. For example, the passenger belt usage display 354 may correspond to the percentage of time that the driver uses the seatbelt while the vehicle speed is greater than 0 mph (or other suitable speed). In general, the passenger belt usage display 354 is a running summary of belt usage detected by the device 22 (e.g., from inputs received from the PCM 32 and the RCM module 36). The device 22 takes into account vehicle speed while monitoring belt usage for the passenger so that the driver is not penalized for removing his/her seatbelt while at a drive thru, car wash, toll booth, etc.

The total area fill within the display 354 is a function of the time that the passenger is wearing the seatbelt. The color of the fill area within the display 354 depends on the percentage of time the seat belt is used. The color of the fill may be green if a 95% seat belt usage is detected. The color of the fill may be yellow if a seat belt usage of between 90 and 95% is detected. The color fill may be red if a seat belt usage of below 89% is detected.

The display 24 of the device 22 may include a speed profile display 356. The device 22 may generate the speed profile display 356 based on data collected via the state diagram 170 as discussed in connection with FIG. 4F. The speed profile display 356 depicts information regarding the total time driven between the intervals of 0-54 mph, 55 mph-64 mph, and over 65 mph. The device 22 monitors data received from the PCM 32 to provide information in the speed profile display 356.

In general, the primary driver is able to discern the amount of time the secondary driver spends in each speed range based on the data presented in the display 356. For example, the primary driver may determine if the secondary driver drives predominately on the highway as opposed to the city/town. Partitioning the total time between the speed intervals may provide a more complete picture of the speed profile of the secondary driver as opposed to merely showing the average and maximum speed.

One possible benefit to partitioning the time across speed intervals is to avoid penalizing the secondary driver for driving at high speed for short periods of time. For example, if the secondary driver temporarily drives at a high speed (i.e., passing, emergency, etc.), the device 22 records the event as a short time interval, whereas a simple "maximum speed" profile may be skewed on the high side with no way to determine the actual profile.

An odometer style needle may be placed within the display 356 to indicate the maximum speed achieved while driver by the secondary driver w/o skewing the rest of the speed profile. A max speed text box may be included within the display 356 to indicate the max recorded speed of the secondary driver.

The display 24 of the device 22 may include an OCD usage display 358. The device 22 may generate the OCD usage display 358 based on data collected via the state diagram 130 as discussed in connection with FIG. 4B. The OCD usage display 358 corresponds to the percentage of time the secondary driver spends using the OCD 54 while actually driving the vehicle. The device 22 monitors inputs from the PCM 32 and the APIM 50 to provide such data. The display 358 depicts OCD usage when the secondary driver is on the phone (i.e., regardless of whether the OCD is paired to the vehicle) and when the vehicle speed is greater than zero (or other suitable speed). The intent is not to show OCD usage when the vehicle is not traveling (or moving) so as not to penalize the secondary driver. The display 358 also includes an indicator corresponding to how often the secondary driver pairs his/her OCD 54 to the APIM 50 so as to indicate the percentage of time the secondary driver utilizes hands-free operation provided by the APIM 50.

In general, the total fill area within the display 358 is a function of time spent on the OCD 54 while driving the vehicle. The color of the fill area within the display 358 depends on the percentage of time the phone is used (and when the vehicle is being driven). For example, the color fill for the display 358 may be green if the OCD usage is detected to be below 25%. The color of the fill for the display 358 may be yellow if the OCD usage is between 26%-49%. The color of the fill for the display 358 may red if the OCD usage is over 50%.

It is generally contemplated that the data displayed in the display 24 as noted in connection with FIG. 6 may be audibly presented to the primary driver. Further, such data may be transferred via e-mail or USB interface to the primary driver. The data may be automatically presented upon the expiration of the predetermined distance interval, or as current stats prior to the vehicle achieving the expiration of the predetermined distance interval. The report that is downloaded by the user may also include the illustrated detailed period report so that such data can be stored to a personal computer or shown on a printed version of the report. The device 22 and/or the award center 56 may compare the usage ratings of the profiles as illustrated in the display 350, 352, 354, 356, and 358 to predefined usage criteria to determine when it is appropriate to issue an award.

FIG. 7 depicts a detailed report corresponding to the recorded events for the secondary driver. Such a report can be viewed at the device 22, uploaded and e-mailed to the primary driver (or to the awards center 56), or downloaded to a portable memory device along with the illustrated detailed periodic report of FIG. 6. As seen with the detailed report, more information is provided than that shown in FIG. 6. For example, the detailed report contains details corresponding to driver/passenger belt status (buckled/unbuckled), phone usage status (OCD 54 paired/unpaired to APIM 50), and the type of potential collision event (e.g., erratic maneuver as detected by the RCM 36, FCW warning, Tailgate warning, Driver Impairment Warning (DIMON), Advance Traction Control (e.g., as detected by ESC module 34), Alert, and Lane Departure. The detailed report further includes information as to the date, time, and speed in which the events where detected to occur. In one example, the device 22 may use detected potential collision events as a trigger to further collect data regarding data/time, speed, driver/passenger buckle status and OCD status when such potential collision event occur. It is contemplated that the generated report includes all of the information contained in FIGS. 6-7.

FIG. 8 depicts a summary statistics report which is a summary of a predetermined number of generated reports. The summary report may include statistics for 1000 miles, 2000 miles, 3000 miles, etc. The number of reports used to provide the summary statistics report may vary based on the desired criteria of a particular implementation. The summary statistics are generally configured to show trends or improvements over time if so warranted based on the driving behavior of the secondary driver.

The data as illustrated in FIGS. 6-8 can be transmitted to the primary or the secondary driver at any time the user requests to see the data or upon the detection of the predetermined distance interval being achieved. It is also recognized that the vehicle type, make and/or vehicle identification number (VIN) may be included on each report as it is contemplated that the secondary driver may use multiple vehicles belonging to the primary driver. This condition will allow the primary driver to review performance data for the secondary driver for a particular vehicle.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for recording events in a vehicle based on status of a driver, the apparatus comprising:
 a vehicle interface device configured to:
  receive a driver status signal indicative of the driver being one of a primary driver and a secondary driver;
  receive at least one vehicle event signal in response to the driver status signal indicating that the driver is the secondary driver;
  store information from the at least one vehicle event signal to determine at least one vehicle event usage profile for the secondary driver; and
  provide a report that includes the least one vehicle event usage profile for transmission to at least one of the primary driver and the secondary driver, the at least one vehicle event usage profile includes at least one of belt usage profile and an occupant communication device usage profile.

2. The apparatus of claim 1 wherein the belt usage profile corresponds to at least an amount of time the secondary driver is buckled with a seatbelt.

3. The apparatus of claim 2 wherein the belt usage profile corresponds to the amount of time the secondary driver is buckled with the seatbelt while the vehicle is traveling above a predetermined speed value.

4. The apparatus of claim 1 wherein the belt usage profile corresponds to at least an amount of time one or more passengers with the secondary driver is buckled with a seatbelt.

5. The apparatus of claim 4 wherein the belt usage profile corresponds to the amount of time the one or more passengers with the secondary driver is buckled with the seatbelt while the vehicle travels above a predetermined speed value.

6. The apparatus of claim 1 wherein the occupant communication device usage profile corresponds to at least an amount of time the secondary driver is using an occupant communication device while driving the vehicle.

7. The apparatus of claim 1 wherein the at least one vehicle event usage profile further includes an occupant communication device usage pair profile corresponding to an amount of time the secondary driver has not electrically coupled an occupant communication device to a module positioned in the vehicle to enable hands-free operation of the occupant communication device.

8. An apparatus comprising:
 a vehicle interface device configured to:
  determine whether a driver is a primary driver or a secondary driver based on a driver status signal;
  receive a vehicle event signal to determine a vehicle event usage profile for the secondary driver; and
  provide a report that includes the vehicle event usage profile for transmission to the primary driver, the vehicle event usage profile including a belt usage profile for the secondary driver.

9. The apparatus of claim 8 wherein the belt usage profile corresponds to at least an amount of time the secondary driver is buckled with a seatbelt.

10. The apparatus of claim 9 wherein the belt usage profile corresponds to the amount of time the secondary driver is buckled with the seatbelt while traveling above a predetermined speed value.

11. The apparatus of claim 8 wherein the belt usage profile corresponds to at least an amount of time one or more passengers with the secondary driver is buckled with a seatbelt.

12. The apparatus of claim 11 wherein the belt usage profile corresponds to the amount of time the one or more passengers with the secondary driver is buckled with the seatbelt while traveling above a predetermined speed value.

13. The apparatus of claim 8 wherein the vehicle event usage profile further includes an occupant communication device usage profile that corresponds to at least an amount of time the secondary driver is using an occupant communication device while driving a vehicle.

14. The apparatus of claim 13 wherein the occupant communication device usage profile corresponds to at least an amount of time the secondary driver is using an occupant communication device while driving a vehicle.

15. The apparatus of claim 8 wherein the vehicle event usage profile further includes an occupant communication device usage pair profile corresponding to an amount of time the secondary driver has not electrically coupled an occupant communication device to a module positioned in a vehicle to enable hands-free operation of the occupant communication device.

16. An apparatus comprising:
 a vehicle interface device configured to:
  determine whether a driver is a primary driver or a secondary driver based on a driver status signal;

receive a vehicle event signal to determine a vehicle event usage profile for the secondary driver; and provide a report that includes the vehicle event usage profile for transmission to the primary driver, the vehicle event usage profile including an occupant communication device usage profile for the secondary driver.

17. The apparatus of claim 16 wherein the occupant communication device usage profile corresponds to at least an amount of time the secondary driver is using an occupant communication device while driving a vehicle.

18. The apparatus of claim 16 wherein the vehicle event usage profile further includes an occupant communication device usage pair profile corresponding to an amount of time the secondary driver has not electrically coupled an occupant communication device to a module positioned in a vehicle to enable hands-free operation of the occupant communication device.

\* \* \* \* \*